US007238223B2

(12) United States Patent
Meegan, Jr.

(10) Patent No.: US 7,238,223 B2
(45) Date of Patent: Jul. 3, 2007

(54) ACOUSTICAL STIMULATION OF VAPOR DIFFUSION SYSTEM AND METHOD

(75) Inventor: G. Douglas Meegan, Jr., Austin, TX (US)

(73) Assignee: Board of the Regents, The University of Texas System, Austin, TX (US)

( * ) Notice: Subject to any disclaimer, the term of this patent is extended or adjusted under 35 U.S.C. 154(b) by 150 days.

(21) Appl. No.: 10/700,904

(22) Filed: Nov. 3, 2003

(65) Prior Publication Data

US 2004/0124155 A1    Jul. 1, 2004

Related U.S. Application Data

(60) Provisional application No. 60/422,970, filed on Nov. 1, 2002.

(51) Int. Cl.
| | |
|---|---|
| B01D 51/08 | (2006.01) |
| B01D 53/10 | (2006.01) |
| B01D 53/50 | (2006.01) |
| B01D 53/56 | (2006.01) |
| B01D 53/64 | (2006.01) |

(52) U.S. Cl. .................. 95/29; 95/1; 95/36; 95/65; 95/107; 95/128; 95/134; 95/137; 95/232; 95/234; 95/235; 95/237; 95/273; 95/901; 96/108; 96/233; 96/389; 55/282; 55/301; 55/341.1; 55/361; 55/434; 181/14; 423/239.1; 423/242.1; 423/243.08

(58) Field of Classification Search .............. 95/1, 95/29, 36, 57, 63, 65, 90, 107, 129, 134, 95/137, 148, 214, 232, 234, 235, 237, 273, 95/278, 901; 96/15, 108, 228, 283, 389; 55/282, 301, 341.1, 361, 434; 181/0.5, 141; 34/279; 210/748; 423/239.1, 242.1, 243.08
See application file for complete search history.

(56) References Cited

U.S. PATENT DOCUMENTS

| | | | | |
|---|---|---|---|---|
| 2,448,372 | A | 8/1948 | Horsley | 259/1 |
| 2,535,679 | A | 12/1950 | Horsley et al. | 183/114 |
| 2,535,700 | A | 12/1950 | Seavey et al. | 183/114 |
| 2,609,063 | A | 9/1952 | Francis | 183/32 |
| 2,646,133 | A | 7/1953 | Schutt | 183/32 |
| 3,026,966 | A | 3/1962 | Asklof | 183/15 |
| 3,389,971 | A | 6/1968 | Alliger | 23/277 |
| 3,643,623 | A * | 2/1972 | Eng et al. | 95/29 |
| 3,681,009 | A | 8/1972 | Horsley | 23/2 R |
| 3,763,634 | A | 10/1973 | Alliger | 55/223 |

(Continued)

FOREIGN PATENT DOCUMENTS

DE    35 07 596    9/1986

(Continued)

OTHER PUBLICATIONS

Chris Everett Peterson, B.S., Thesis: "Experimental Studies in Acoustic Agglomeration: Dependence on Frequency and SPL," Aug. 2000, 103 pgs.

(Continued)

Primary Examiner—Jason M. Greene
(74) Attorney, Agent, or Firm—Hunton & Williams LLP

(57) ABSTRACT

An apparatus for removing constituents from a fluid stream is provided. The apparatus includes a duct, a collection device, a sorbent injector, and an acoustic generator. The duct has a fluid passageway to receive a fluid stream having constituents. The collection device filters the fluid stream. The sorbent injector injects a sorbent in the fluid passageway of the duct. The acoustic generator generates an acoustic field in the fluid passageway of the duct to promote sorption of the constituents for collection by the collection device. Additionally, a method is provided for removing constituents from a fluid stream.

195 Claims, 7 Drawing Sheets

U.S. PATENT DOCUMENTS

| | | |
|---|---|---|
| 3,771,286 A | 11/1973 | Scott |
| 4,253,508 A | 3/1981 | Bodai et al. |
| 4,307,964 A | 12/1981 | Dudgeon et al. ........... 366/127 |
| 4,313,920 A | 2/1982 | Cooper ....................... 423/449 |
| 4,319,891 A | 3/1982 | Anderson et al. ............... 55/15 |
| 4,347,983 A | 9/1982 | Bodai |
| 4,378,976 A | 4/1983 | Rush ............................. 55/15 |
| 4,475,921 A | 10/1984 | Barmatz ................... 23/313 R |
| 4,584,000 A | 4/1986 | Guest ............................ 55/73 |
| 4,770,675 A | 9/1988 | Kurzweg et al. ............. 55/15 |
| 4,948,497 A | 8/1990 | Ohkawa ........................ 209/1 |
| 5,085,673 A | 2/1992 | Bentley et al. ................. 55/10 |
| 5,085,783 A | 2/1992 | Feke et al. .................. 210/748 |
| 5,147,562 A | 9/1992 | Heyman ..................... 210/748 |
| 5,164,094 A | 11/1992 | Stuckart .................... 210/708 |
| 5,183,481 A | 2/1993 | Felder ........................... 55/15 |
| 5,197,399 A | 3/1993 | Mansour .................... 110/345 |
| 5,225,089 A | 7/1993 | Benes et al. |
| 5,353,721 A | 10/1994 | Mansour et al. ............ 110/345 |
| 5,419,877 A * | 5/1995 | Goforth et al. ............... 96/389 |
| 5,769,913 A | 6/1998 | Gallego Juarez et al. ..... 55/277 |
| 5,827,350 A | 10/1998 | Magill et al. .................. 95/29 |
| 6,171,366 B1 * | 1/2001 | Vicard et al. .................... 95/1 |
| 6,322,613 B1 * | 11/2001 | Wojtowicz et al. ........... 95/107 |
| 6,447,574 B1 | 9/2002 | Frier, Jr. et al. ................ 95/29 |
| 6,451,094 B1 * | 9/2002 | Chang et al. ................. 95/901 |
| 6,749,666 B2 | 6/2004 | Meegan, Jr. ................... 95/29 |
| 2004/0168576 A1 | 9/2004 | Meegan, Jr. |

FOREIGN PATENT DOCUMENTS

| | | |
|---|---|---|
| JP | 52-148479 | 12/1977 |
| JP | 07-240432 | 9/1995 |
| JP | 10-216463 | 8/1998 |
| JP | 2001-087623 | 4/2001 |
| WO | WO 94/26391 | 11/1994 |

OTHER PUBLICATIONS

D. S. Scott, "*A New Approach to the Acoustic Conditioning of Industrial Aerosol Emissions*" (Journal of Sound and Vibration) 1975, 43(4), pp. 607-619.

J. A. Gallego et al., "*A Pilot Scale Acoustic System For Fine Particle Removal From Coal Combustion Fumes*" (1995 World Congress on Ultrasonics), pp. 737-740, Madrid, Spain.

Karl Matthew Martin, B.S., "*Acoustic Filtration in a Closed System*" (Thesis), Dec. 1997, 91 pgs., The University of Texas at Austin.

* cited by examiner

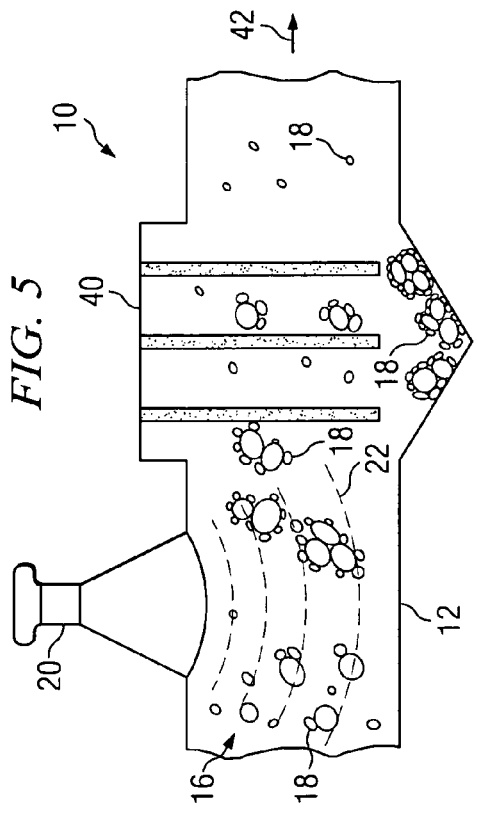
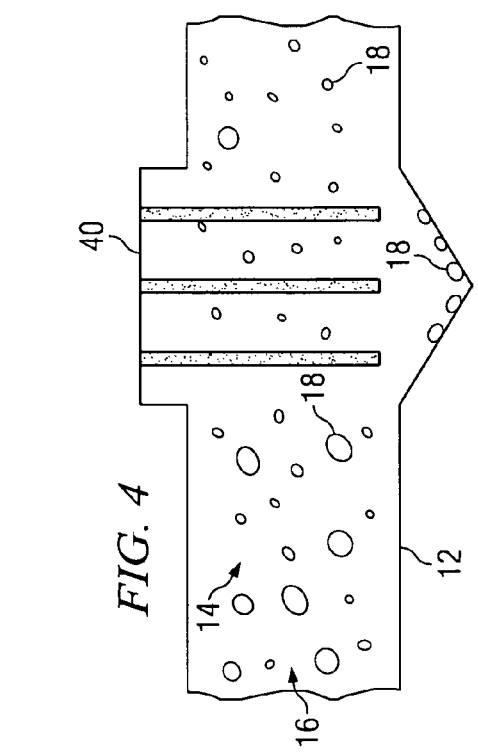
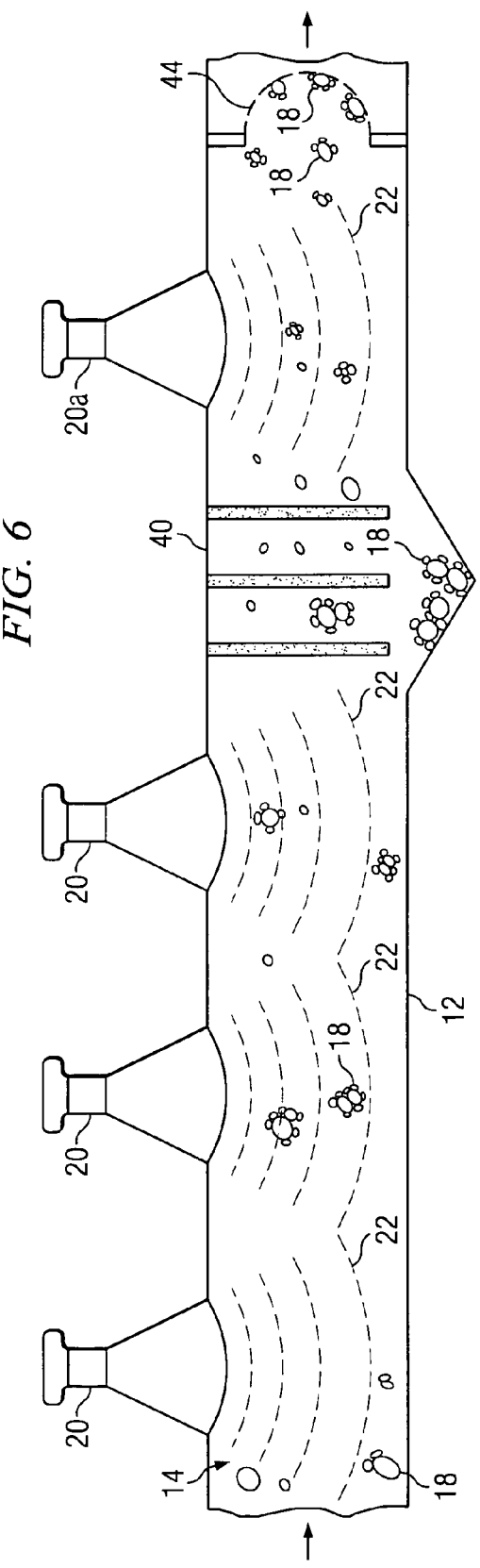

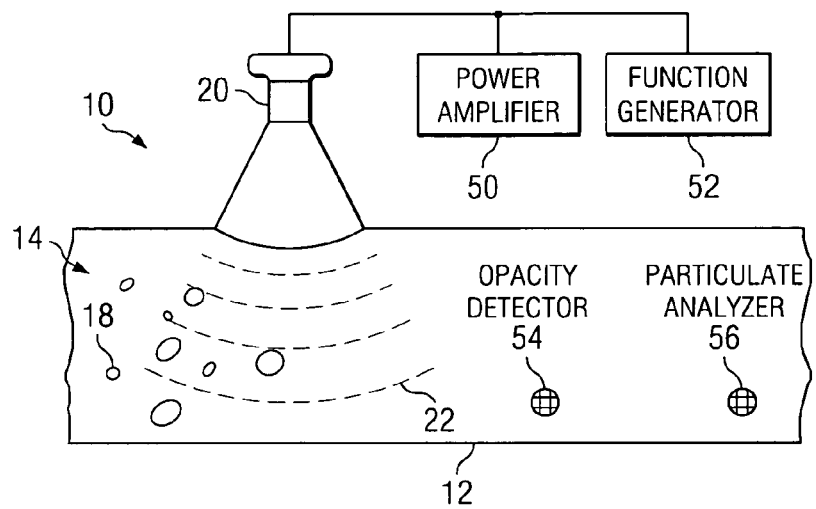
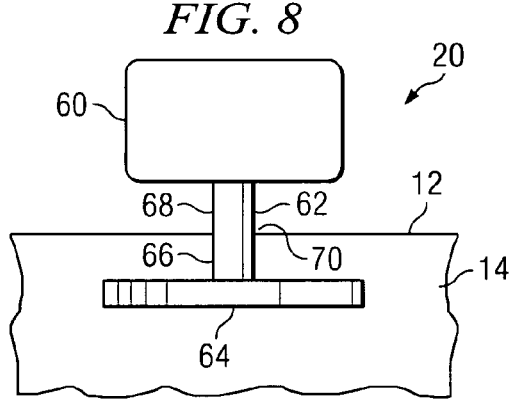
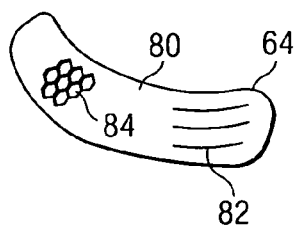
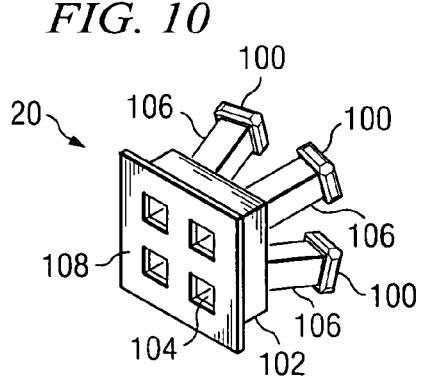
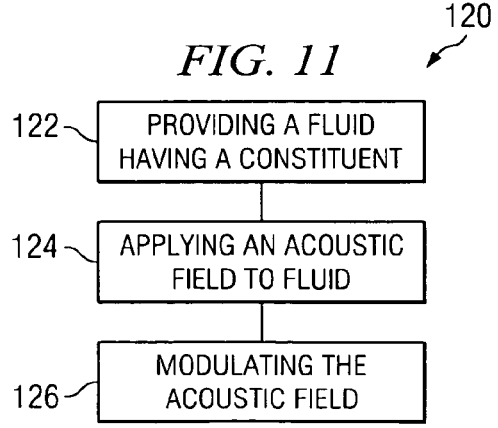

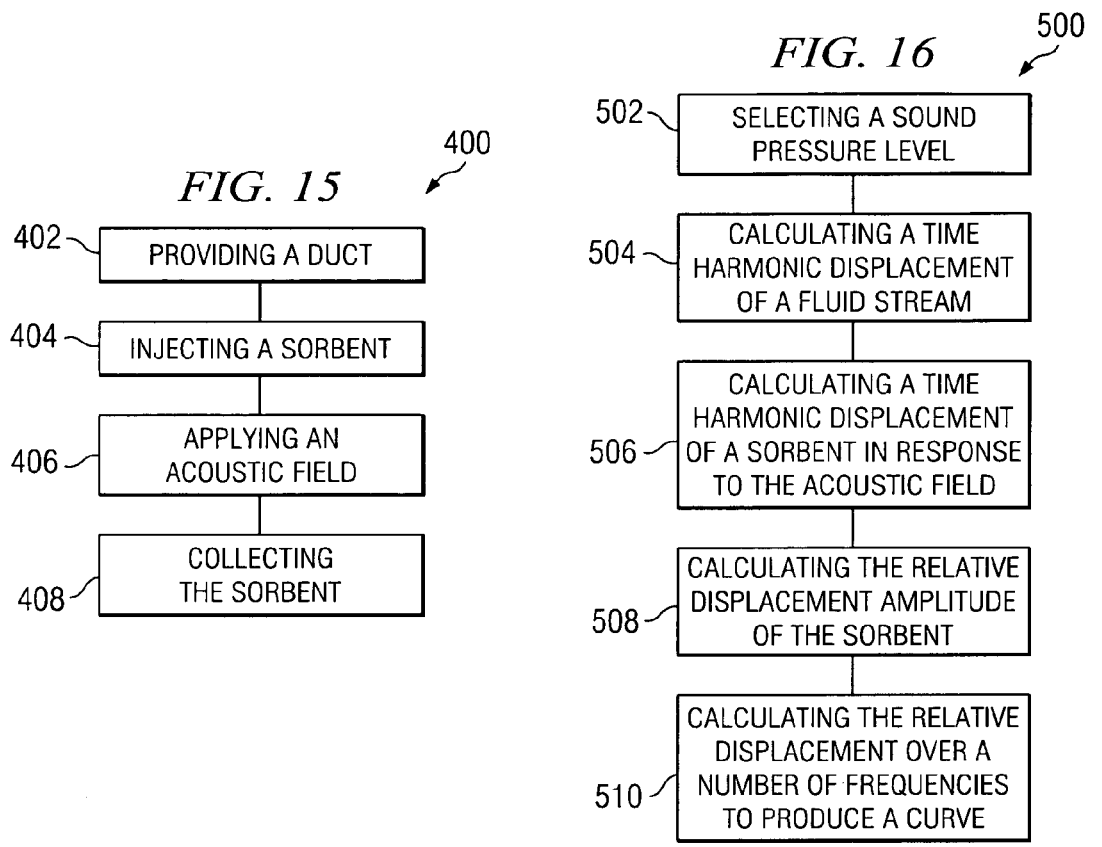
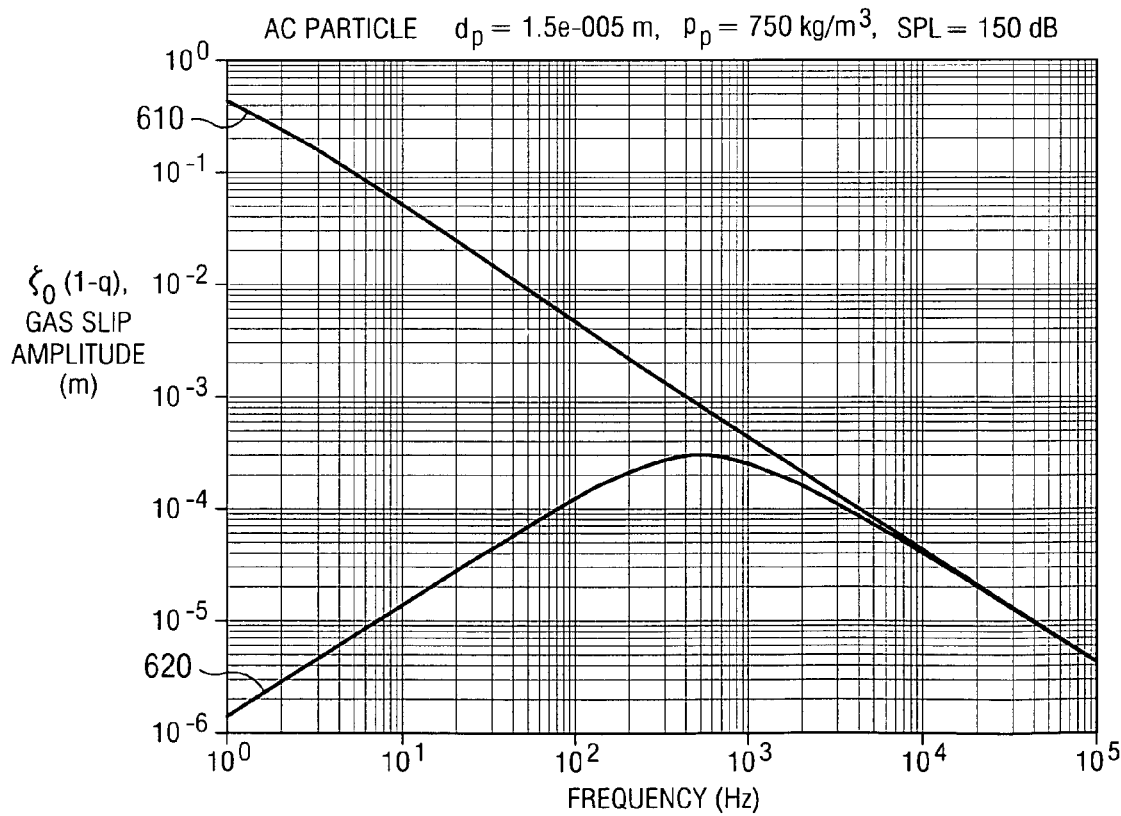

ACOUSTICAL STIMULATION OF VAPOR DIFFUSION SYSTEM AND METHOD

CROSS-REFERENCE TO RELATED APPLICATIONS

Pursuant to 35 U.S.C. §119(e), this application claims the benefit of U.S. Provisional Patent Application No. 60/422,970, entitled Acoustical Stimulation of Vapor Diffusion System and Method, filed Nov. 1, 2002, naming G. Douglas Meegan, Jr. inventor, which is hereby incorporated by reference for all purposes.

TECHNICAL FIELD OF THE INVENTION

The present invention relates generally to the field of acoustic stimulation of fluids, and more particularly, but not by way of limitation, to an acoustical stimulation system and method of vapor diffusion towards a surface.

BACKGROUND OF THE INVENTION

Fluid streams comprising small constituents are produced by many chemical and combustion processes, such as, but not limited to, particulates in the exhaust gas stream of coal fired power plants. Such constituents may include, for example, vaporous forms of these constituents. For environmental and other reasons, it may be desirous to remove these constituents. Sorbents—the term "sorbent", including, but not limited, to both "adsorbent" and "absorbent"—may be injected into the gas exhaust streams exiting power plant boilers to promote removal of these constituents. The dilute vapor can be removed by means of interaction of the vapor with the surface of the sorbent; however, the removal efficiency of sorbent injection can be limited, depending on a number of factors including the time the sorbent has to interact with the constituent and the entrainment of the constituents in the gas exhaust stream. A need exists for an improved system and method to promote improved removal of constituents from a fluid stream.

Additionally, in the use of the sorbent injection technology, collection devices, such as a fabric filter bag house, are frequently provided downstream of the sorbent injector. While sorbent injection is proven as one method of satisfying constituent emissions regulations—e.g., mercury emission regulations in facilities, such as coal-fired power plants, the use of such sorbents will typically increase the frequency of bag cleaning. For example, in the use of a sorbent, such as activated carbon, to remove a constituent, such as mercury, the cleaning frequency can be tripled as a result of activated carbon being injected at levels required to remove about 80% total mercury. Therefore, the increase in bag cleaning frequency becomes one of the greatest concerns with the use of sorbent injection to reduce constituent emission. It is clearly necessary to develop cost-effective methods to substantially reduce or eliminate the negative effects of sorbent injection on the fabric filter cleaning frequency.

In yet other situations, sorbents may be injected into exhaust streams and collected by other means such as electrostatic precipitators, cyclone collectors, gravitational settling chambers, and others. In these cases, bag cleaning is not an issue, but the cost of sorbents can be very high for a variety of reasons. In this case it is clearly necessary to develop methods to achieve more effective mercury removal for a given amount of injected sorbent, thereby reducing costs and/or improving mercury removal.

It is to such an acoustical stimulation system and method of vapor diffusion towards a surface that the present invention is directed.

SUMMARY OF THE INVENTION

In one aspect of the invention, an apparatus for removing constituents from a fluid stream is provided. The apparatus comprises a duct, a collection device, a sorbent injector, and an acoustic generator. The duct has a fluid passageway to receive a fluid stream having constituents. The collection device is coupled to the duct and in communication with the fluid passageway to filter the fluid stream. The sorbent injector injects a sorbent in the fluid passageway of the duct upstream of the collection device. The acoustic generator generates an acoustic field in the fluid passageway of the duct to promote sorption of at least some of the constituents for collection by the collection device.

In another aspect of the invention, a method is provided for removing constituents from a fluid stream. The method comprises providing a duct defining a fluid passageway; providing a fluid stream having constituents in the fluid passageway of the duct; injecting a sorbent in the fluid stream; and applying an acoustic field in the fluid stream to promote sorption of at least some of the constituents.

In yet another aspect of the invention, an apparatus is provided for removing constituents from a fluid stream. The apparatus comprises a scrubber tower, a liquid injector, and an acoustic generator. The scrubber tower has a chamber defining a fluid passageway to receive a fluid stream having constituents. The liquid injector is coupled to the scrubber tower and is operable to inject a liquid agent in the scrubber tower. The acoustic generator generates an acoustic field in the chamber of the scrubber tower to promote a chemical reaction with at least some of the constituents.

In yet another aspect of the invention, a method is provided for enhancing mass transfer from a dilute vapor towards the surface of a sorbent. The method comprises providing a fluid stream having a dilute vapor; injecting a sorbent having a surface into the fluid stream; and applying an acoustic field to the fluid stream to promote diffusion of the vapor toward the surface of the sorbent.

In yet another aspect of the invention, a method is provided for enhancing mass transfer from a dilute vapor towards the surface of a sorbent. The method comprises providing a gas stream having a dilute vapor; injecting a liquid spray into the fluid stream; applying an acoustic field to the fluid stream to promote removal of the dilute vapor; and providing a collection device to collect the liquid which has chemically reacted with the dilute vapor.

In yet another aspect of the invention, a method is provided for determining a frequency of sound to increase the acoustical stimulation of vapor diffusion. The method comprises selecting a sound pressure level of an acoustic field; calculating a time harmonic acoustic displacement of a fluid stream; calculating a time harmonic displacement of an agent particle in response to the acoustic field and an associated viscous drag effect; calculating a relative displacement amplitude of the agent particle by subtracting the displacement of the agent particle from the displacement of the fluid stream; and calculating the relative displacement over a plurality of frequencies to produce a curve such that the curve includes a global maximum wherein the global maximum is the sound to increase the acoustical stimulation of vapor diffusion.

In yet another aspect of the invention, a method is provided for extending the useful life of a filtration device.

The method comprises providing a duct defining a fluid passageway; providing a filtration device, operable to filter a fluid stream; injecting a sorbent in the fluid stream; applying an acoustic field in the fluid stream to promote sorption of at least some of the constituents; collecting the at least some of the constituents and at least some of the sorbent with the filtration device; and removing the at least some of the constituents and the at least some of the sorbent from the filtration device to clean the filtration device.

In yet another aspect of the invention, a method is provided for enhancing transfer of constituents in a fluid towards a surface of a sorbent. The method comprises providing a fluid with constituents; injecting a sorbent having a surface into the fluid; and applying a modulated acoustic field to the fluid to promote transfer of the constituents towards the surface of the sorbent.

In yet another aspect of the invention, a method is provided for enhancing transfer of constituents in a fluid towards a surface of a sorbent. The method comprises providing a fluid with constituents; injecting a sorbent having a surface into the fluid; applying an acoustic field to the fluid; and frequency modulating the acoustic field to promote transfer of the constituents towards the surface of the sorbent.

In yet another aspect of the invention, an apparatus is provided for removing constituents from a fluid stream. The apparatus comprises a duct, a manifold system, a sorbent injector, and at least a first sound source. The duct has a sidewall defining a fluid passageway and is adapted to receive a fluid stream having the constituents. The manifold system is coupled to the duct such that the manifold system communicates with the fluid passageway. The sorbent injector injects a sorbent in the fluid passageway of the duct. The at least a first sound source is coupled to the manifold system and operable to generate an acoustic field in the fluid passageway of the duct to promote sorption of at least some of the constituents.

In yet another aspect of the invention, an apparatus is provided for removing constituents from a fluid stream. The apparatus comprises a fluid passageway, a collection device, a substance having a reacting surface, and an acoustic generator. The fluid passageway is operable to receive a fluid stream having constituents. The collection device is in communication with the fluid passageway and is operable to filter the fluid stream. The substance having a reacting surface is operable to react with the constituents. The acoustic generator generates an acoustic field in the fluid passageway to promote reaction of at least some of the constituents with the reacting surface of the substance for collection by the collection device.

One advantage of the present invention is that where mercury is desirably removed, injection of activated carbon as a sorbent promotes sorption of elemental and oxidized mercury. However, application of the acoustic field provides for substantial movement and/or mixing of the constituents, including the mercury, relative to the activated carbon sorbent thus exposing the sorbent to portions of the fluid stream having the highest concentrations of mercury, not merely the surrounding or immediately adjacent constituents. The application of the acoustic field causes the sorbent to be exposed to various portions of the mercury entrained in the fluid stream, as opposed to only the mercury entrained in the adjacent fluid stream.

Another advantage of the present invention is that standard particulate removal of, for example, fly ash may be accomplished, for example, upstream of the mercury sorption and removal, which has the additional benefit of not contaminating the removed fly ash constituent with hazardous or undesirable constituents, such as mercury.

Another advantage of the present invention is that the present invention may be usefully employed to promote both sorption and, for example in scrubber tower, to promote enhanced sorption of, for example sulfur and nitrogen oxides, by, for example, a limestone slurry applied in the scrubber towers in power plants. This increased sorption beneficially provides for increased sorption by the limestone slurry, allowing for less slurry to be required or improved removal of the constituents, such as sulfur or nitrogen oxides, to be achieved.

Another advantage of the present invention is the ability to achieve enhanced constituent removal efficiencies with the use of substances, having removal surfaces.

Other objects, features, and advantages of the present invention will be apparent to those skilled in the art from the following detailed description when read in conjunction with the accompanying drawings and appended claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 1 is a side view of one aspect of an acoustic agglomerator illustrating a passageway of a duct containing a fluid stream that may be utilized with the present invention;

FIG. 2 is a graph illustrating the advantages of acoustic modulation for acoustic agglomeration of lignite fly ash;

FIG. 3 is another graph illustrating the advantages of acoustic modulation for acoustic agglomeration of lignite fly ash;

FIG. 4 is a side view of a duct communicating a combustion gas stream to a filtration device;

FIG. 5 is a side view of an acoustic agglomerator provided with an acoustic generator and a filtration device for removal of particulates from a combustion gas stream that may be utilized in conjunction with the present invention;

FIG. 6 is a side view of the duct provided with a plurality of acoustic generators for generating a modulated acoustic field;

FIG. 7 is a side view of another acoustic agglomerator that may be desirably used;

FIG. 8 is a side view of one aspect of the acoustic generator having a mechanical oscillator, a shaft and an acoustic plate;

FIG. 9 is a perspective view of one aspect of the acoustic plate illustrated in FIG. 8;

FIG. 10 is a perspective view of another aspect of the acoustic generator including a plurality of sound sources and a manifold;

FIG. 11 is a flow-chart illustrating a method for acoustic agglomeration by modulation of the acoustic field that may be implemented in conjunction with the present invention;

FIG. 15 is a flow-chart illustrating one aspect of a method for removing constituents from a fluid stream;

FIG. 16 is a flow-chart illustrating one method for selecting a frequency of a sound field to increase the acoustical stimulation of vapor diffusion; and FIG. 17 is a chart, corresponding to an illustration for selecting a frequency of a sound field to increase the acoustical stimulation of vapor diffusion.

DETAILED DESCRIPTION OF THE INVENTION

Figure 12:
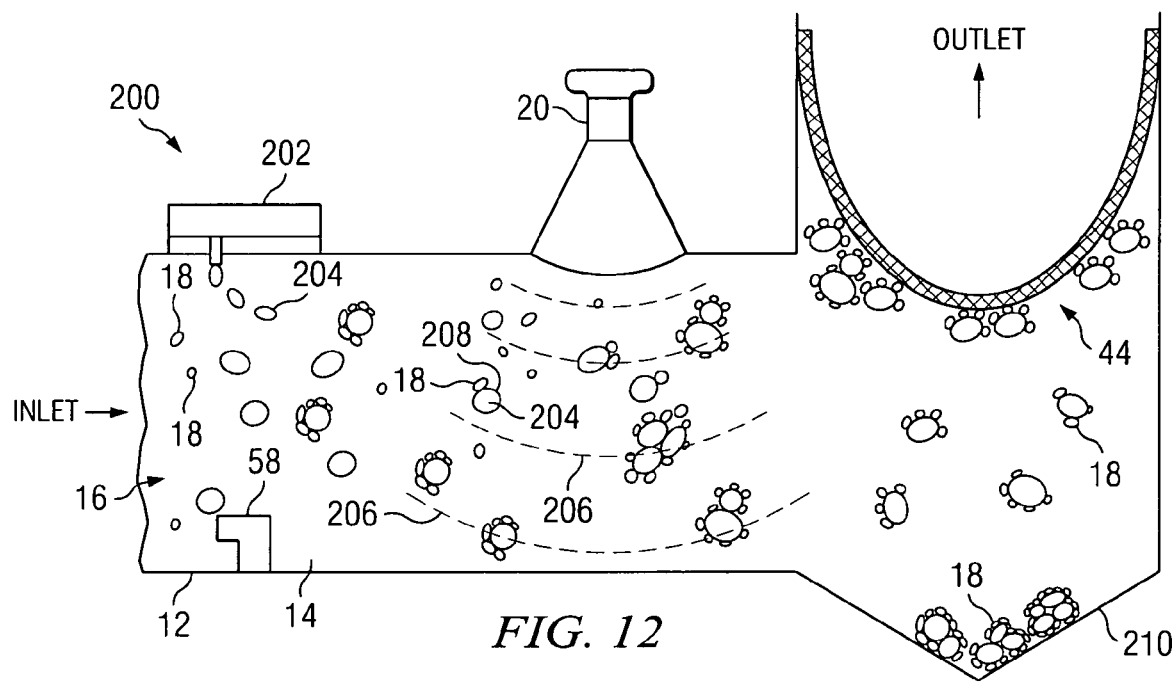
FIG. 12 is a side view of an acoustical stimulation system 200 that increases vapor diffusion towards a surface, according to one aspect of the invention.

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

FIGS. 1–11 are descriptions of exemplary implementations of systems and methods of acoustically agglomerating constituents and particulates that may be usefully employed in various combinations with the present invention. However, the present invention is in no way limited to these implementations and may be used alone without any acoustic agglomeration, in conjunction with these exemplary implementations of acoustic agglomeration systems and methods or with other agglomeration systems and techniques.

Figures 1, 2, 3:
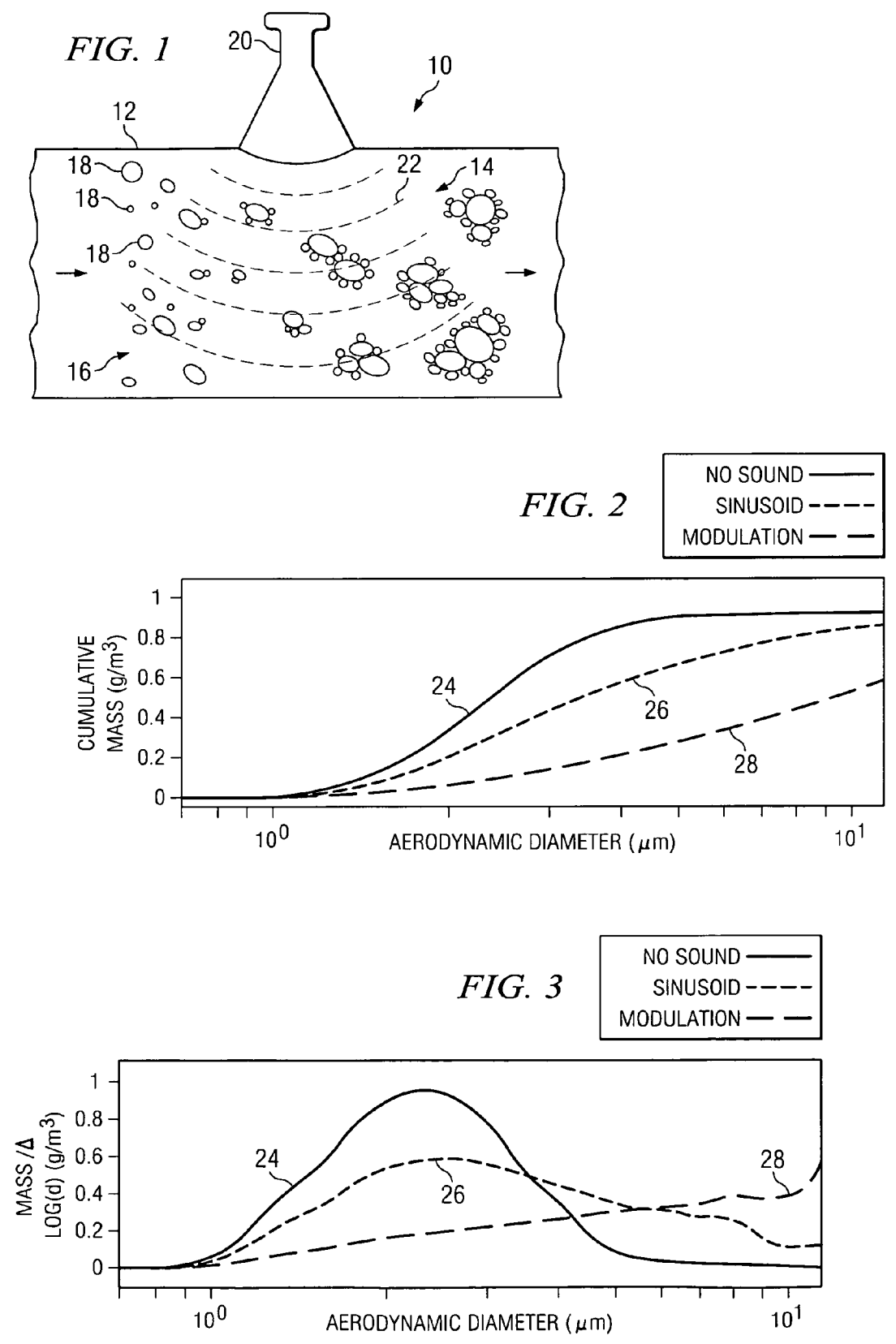

FIG. 1 illustrates one aspect of an acoustic agglomerator 10 for agglomerating constituents in a fluid. The acoustic agglomerator 10, according to one aspect, includes a duct 12 defining a passageway 14. The duct 12 is adapted to receive a fluid stream 16 containing constituents 18 of varying sizes.

The acoustic agglomerator 10 further includes an acoustic generator 20 that is adapted to generate a modulated acoustic field 22 in the passageway 14 of the duct 12. The acoustic field 22 is modulated to enhance agglomeration of the constituents 18 in the fluid stream 16.

The duct 12, according to one aspect, may be an exhaust duct commonly used to transport combustion gas exhaust from the boilers of power generation facilities. Such power generation facilities may burn coal, lignite, or other material to produce electricity, for example. In this aspect, the fluid stream 16 may be the combustion exhaust gas from the boiler of the power generation facility flowing through the duct 12 and the constituents 18 may be particles of lignite fly ash, such as when lignite is the combustion fuel. As previously discussed, it is necessary for environmental and other reasons to reduce the amount of such particles in the gas exhaust, such as the fluid stream 16. By acoustically agglomerating the exhaust gas, the constituents 18, such as the lignite fly ash, may be more effectively and efficiently captured than using conventional techniques.

Conventional power generation facilities utilize devices such as electrostatic precipitators (ESP) bag houses, cyclone separators, gravitational settling chambers and other particulate removal devices that are well known in the art. The conventional filtration devices are only effective when the size of the particulates, such as the constituents 18, are of sufficient size, such as 10 microns or larger, as previously discussed.

One significant advantage presented is that modulating the acoustic field 22 significantly enhances the agglomeration of the constituents 18 in the fluid stream 16 which promotes the removal of the constituents 18 in their agglomerated form by conventional filtration or other methods. While implementation may be described with respect to power plant and power generation facilities and agglomeration of combustion gas exhaust, for example, it should be appreciated, however, that acoustic agglomeration is in no way limited to this application and it is anticipated and within the spirit and scope of the present invention that a modulated acoustic field 22 may be applied to fluid in an unlimited number of various applications for the purposes of agglomerating constituents 18.

For example, while the fluid stream 16 is illustrated as traveling in a duct 12, in the present illustration, it is within the spirit and scope of the present invention that the acoustic field be applied to a chamber enclosing and completely retaining the fluid stream 16 or in open air applications where there is no containment of the fluid stream 16. Also, the fluid stream 16 may be an outdoor environment wherein the constituents 18 that are to be desirably removed may be pollution, biohazardous materials or chemicals in the air or environment, such as those accidentally or intentionally placed into the atmosphere that are hazardous to individuals or the environment.

The acoustic field 22 may further be applied to large areas, such as, but not limited to, within buildings or facilities where constituents 18, such as foreign particles that are desirably removed from the air, may exist and for environmental and health reasons the constituents 18 must be removed. The acoustic agglomerator 10 may further have application in industrial situations where water, such as lakes and streams, have become polluted or contaminated and the pollutant or contaminant is desirably removed.

Other applications that would benefit from the present invention include manufacturing or other facilities where airborne particles require filtration for health, safety, and other reasons, such as within manufacturing facilities or otherwise. Additional applications include, for example, exhaust systems of conventional combustion engines used in the automotive industry to reduce dangerous and hazardous pollutants before being expelled into the atmosphere. Furthermore, while the fluid stream 16 may be illustrated as gas exhaust, in other aspects the fluid stream may be a gas or a liquid.

As previously discussed, applying a modulated acoustic field 22 promotes agglomeration since the smaller particles move in response to the acoustic wave more so than larger particles which result in more collisions of the larger and smaller particles. Once the collision occurs, electrostatic force promotes retention of the particles. Although sinusoidal waves produced by various sound sources may produce limited agglomeration, the present invention illustrates that dramatic agglomeration may be achieved by modulating the acoustic field 22. It will be appreciated, however, that the preferable frequency and amplitude of the acoustic field 22, as well as the modulation range, is heavily dependent upon the type of particulate matter, such as the constituents 18, that are desirably agglomerated.

FIG. 2 and FIG. 3 illustrate application of acoustic field 22 to promote agglomeration of lignite fly ash and the effects of applying a modulated acoustic field 22. The basis for these measurements include that the exhaust gas containing the fly ash was moving through the duct 12 at a rate of approximately 3 feet per second. The No Sound 24 measurement represents the particulate size of the combustion gas exiting from the boiler without the application of an acoustic field 22. The sinusoid 26 measurement includes application of a sinusoidal wave applied at approximately 600 Hz to the combustion gas exhaust and illustrates the resulting size of the particulate matter agglomeration. The modulation measurement 28 illustrates the effects of agglomeration by application of a modulated acoustic field 22 having a sound pressure level of approximately 150 dB referenced to 20 micro-Pascals at approximately 600 Hz modulated plus or minus 150 Hz. It will be appreciated, however, that the desired range of frequency and sound pressure level modulation should in no way be limited to the present example and many other ranges of modulation and settings of the frequency and sound pressure levels may be used according other aspects of the present invention.

It can be seen that application of a modulated acoustic field 22 to the fluid stream 16, such as the combustion gas exhaust containing constituents 18 of lignite fly ash, significantly enhances agglomeration and increases the mass of the particulate which promotes more effective and efficient removal by conventional filtration techniques as previously described. It can be seen that, for example, 0.5 to 2 micron particles in size may be effectively agglomerated to, for example, about 2 to 5 microns in size by application of a modulated acoustic field 22.

It will be appreciated that a bag house or ESP responds readily to this size and effectively eliminates particles in the 2 to 5 micron range. Although an ESP is effective at removing larger particulate matter, a significant amount of the smaller particulate are unaffected and causes emission and environmental problems, such as increased levels of opacity. In one aspect, application of the modulated acoustic field 22 may provide additional benefits, such as advantageously moving particles trapped in nodal positions. By changing the frequency the nodal position is shifted which further promotes agglomeration of the particulate matter.

Modulation of the acoustic field 22 may be accomplished by modulating the frequency of the acoustic field 22, or the amplitude of the acoustic field 22, or a combination of modulating both the frequency and the amplitude of the acoustic field 22. Such a modulation can be accomplished with only a single sound source; or, multiple sound sources can also be used. For example, to generate a frequency modulated sound field with a single sound source, the pitch generated by that single sound source would be changed in time. To generate a amplitude modulated sound field with a single sound source, the amplitude generated by that single sound source would be changed in time. The same modulations can be accomplished with multiple sound sources, where all the sound sources modulate in the same way, or differently.

Depending upon the type of constituents 18 desirably removed from the fluid stream 16 a number of combinations of frequency and/or amplitude modulation may be desirably achieved to promote and optimize agglomeration. Although the above frequency and amplitude ranges may be desirable, according to one aspect for agglomerating lignite fly ash in a combustion gas exhaust stream, it will be appreciated that in other applications the range of frequency and amplitude may change significantly.

For example, the acoustic field 22, according to one aspect, may be frequency modulated in a range of up to 1 GHz and the amplitude of the acoustic field may be modulated in a range of up to 200 dB. In other aspects the frequency of the acoustic field 22 may be modulated in a range of up to 20 kHz and the amplitude of the acoustic field 22 may be modulated in a range of up to 200 dB. According to other aspects, the frequency of the acoustic field 22 may be preferably modulated in a range of from about 50 Hz to about 15 kHz and amplitude modulated in a range of from about 130 dB to about 175 dB.

The modulation of the acoustic field 22, according to one aspect, may preferably have an initial frequency such that the acoustic field 22 is thereafter frequency modulated relative to the initial frequency to a first frequency substantially less than the initial frequency while in other aspects the first frequency may be substantially greater than the initial frequency. According to other aspects, the frequency may be preferably modulated to a first frequency substantially greater than the initial frequency and thereafter modulated to a second frequency substantially less than the initial frequency, while in other aspects it may be preferable to modulate the acoustic field 22 to a first frequency substantially less than the initial frequency and thereafter to a frequency substantially greater than the initial frequency.

FIG. 4 illustrates a side view of a conventional exhaust duct 12 having an electrostatic precipitator (ESP) 40 disposed in the duct 12 such that the fluid stream 16 communicates through the passageway 14 to the ESP 40. The ESP 40, as previously discussed, is a well known conventional filtration system capable of removing constituents 18 of a certain size. However, the ESP 40 is ineffective for removing constituents 18 of smaller size, as illustrated.

FIG. 5 illustrates a perspective view of the acoustic agglomerator 10 utilized in a gas exhaust duct 12, substantially as illustrated in FIG. 4. In this aspect it can be seen that application of a modulated acoustic field promotes agglomeration of the constituents 18 which aids the ESP 40 in removing more of the constituents 18, such that only a fraction of the smaller constituents 18 are allowed to escape through this process.

Although the acoustic generator 20 is shown disposed substantially perpendicular to the direction 42 of the flow of the fluid stream 16, it should be appreciated that the acoustic generator 20 may be disposed longitudinally to the direction 42 of flow of the fluid stream 16 or, according to other aspects, at an angle arbitrary to the direction 42 of the flow of the fluid stream 16. It should also be appreciated that the frequency of the acoustic field may be modulated exponentially, linearly, non-linearly, or applied for a periodic interval, according to other aspects of the present invention, to preferably achieve acoustic agglomeration of constituents 18 to a predetermined size.

This presents another significant advantage of the present invention in that by modulating the acoustic field 22 according to different frequency and amplitude modulation ranges, the constituents may be agglomerated to a preferably size to optimize the removal of the constituents 18 in the fluid stream 16. This may be useful where the constituents 18, such as lignite fly ash, may be valuable for resale or reuse or otherwise but only where the lignite fly ash, for example, is of a predetermined size. The present invention is capable of applying a modulated acoustic field 22 to agglomerate particulate to a desired size.

FIG. 6 illustrates another aspect of the an acoustic agglomerator 10 including a plurality of acoustic generators 20 disposed along the duct 12 such that the acoustic generators 20 are operable to produce a modulated acoustic field 22 within the passageway 14 of the duct 12. It can be seen that, according to one aspect, it may be preferable to provide a plurality of acoustic generators to apply a plurality of acoustic fields 22 to optimize the agglomeration of the constituents 18 in the fluid stream 16.

In this aspect, the acoustic field 22 generated by each of the acoustic generators 22 may be modulated according to a predetermined frequency and/or amplitude for optimum agglomeration. The predetermined characteristics of the acoustic field 22, including the initial amplitude and frequency, as well as the modulation ranges, may, according to some aspects, include providing an acoustic field 22 produced by each of the acoustic generators that is substantially similar, while in other aspects the acoustic field 22 generated by each of the acoustic generators 20 may be different, while in yet other aspects some of the acoustic fields 22 may be similar while others may have different acoustic characteristics.

Furthermore, by positioning the acoustic generators 20 to optimize agglomeration prior to the fluid stream 26 entering the ESP 40, an optimum amount of agglomeration and resulting removal of constituents 18 may be achieved. According to other aspects, additional acoustic generators 20 such as the acoustic generator 20A may be provided downstream of the ESP 40 and prior to other filtration devices, such as a bag house 44.

The bag house 44 may include a filter operable for collecting constituents 18 of a specific size such that the filter may be emptied from time-to-time when the filter becomes full or ineffective because it is clogged. Another advantage of the present invention is that the agglomeration may achieve constituents 18 of a desired size, such as constituents 18 large enough not to become lodged within the filtration membrane, for example, utilized by the bag house 44.

Therefore, the bag house 44 may be optimally emptied of larger agglomerated constituents 18 as opposed to being discarded when the smaller constituents 18 become lodged in the membrane of the filtration portion of the bag house 44. Otherwise, the filtration portion of the bag house 44 is rendered ineffective and must be discarded. Thus, utilization extends the life and reduces the costs of certain conventional filtration devices further reducing the costs and promoting the efficiency of, for example, conventional power plant filtration components.

Furthermore, application of acoustic agglomeration, upstream from the bag house can reduce the required frequency of cleaning because larger agglomerated particles tend to more slowly clog the filter material. This effect has been measured during various slip-stream tests at coal-fired power plants. This provides another advantage since it is well known that a reduction in cleaning frequency can improve bag lifetime because the cleaning process (compressed air and/or shaking) can be destructive.

FIG. 7 illustrates another aspect of the acoustic agglomerator 10 is further provided with a power amplifier 50 in communication with the acoustic generator 20. The power amplifier is operable to amplify the power output of the acoustic generator 20. The acoustic agglomerator 10 further provided with a function generator 52, the function generator 52 is operable to generate frequency modulation of the acoustic field 22 produced by the acoustic generator 20. The acoustic agglomerator 10 is further provided with an opacity detector 54 in communication with the passageway 14 of the duct 12 and operable to detect the opacity of the fluid stream 16.

The acoustic agglomerator 10 is further provided with a particulate analyzer 56 operable to obtain information with respect to the constituents 18 such as, but not limited to, the size of the constituents 18. Utilizing the opacity detector 54 and the particulate analyzer 56, the acoustic agglomerator 10 may operably determine information about the fluid stream 16 and the constituents 18 contained in the fluid stream 16 and in response to, for example, undesirable opacity levels and/or particulate size of the constituents 18, the acoustic field 22 may be modified, such as the frequency and amplitude as well as the modulation, to optimize the agglomeration of the constituents 18.

FIG. 8 illustrates another aspect of the agglomerator 20. The agglomerator 20 includes a mechanical oscillator 60, a shaft 62, and a plate 64. The plate 64 is configured for acoustic generation and may be constructed from a variety of materials such as metal or polymeric materials, for example. The shaft is provided with a first end 66 connected to the acoustic plate 64 and a second end 68 connected to the mechanical oscillator 60. The mechanical oscillator 60 is operable to impart a mechanical oscillation on the second end 68 of the shaft 62 and to the acoustic plate 64 connected to the shaft 62 to generate a modulated acoustic field 22.

The acoustic plate 64, according to this aspect, is disposed within the passageway 14 of the duct 12, as illustrated in partial cutaway in the present view. The shaft 62 projects through an opening 70 in the duct 12 such that the acoustic plate 64 may be oscillated to produce the modulated acoustic field 22 within the duct 12.

FIG. 9 illustrates one aspect of the acoustic plate 64 shown in FIG. 8. In this view, it can be seen that the acoustic plate 64 may be configured in a variety of manners including substantially arcuate or flat. A first side 80 of the acoustic plate 64 is provided with a plurality of ribs 82. In other aspects, the acoustic plate 64 may be constructed in a substantially honeycomb configuration 84 throughout, although only a portion is illustrated in the present view.

Depending upon the different configurations of the acoustic plate 64, various frequencies and modulation ranges may be preferably achieved, such as when the acoustic plate 64 is oval versus substantially circular or rectangularly configured. Although a variety of configurations of the acoustic plate 64 may be utilized and are within the scope of the present invention, no further description of acoustic plate 64 configurations will be described for purposes of brevity.

FIG. 10 illustrates another aspect of the acoustic generator 20. In this aspect the acoustic generator 20 is defined as an electrodynamic compression driver array provided with a plurality of sound sources 100, each operable for generating a modulated acoustic field 22. The acoustic generator 20 further includes a manifold 102 having a main chamber 104 and a plurality of chamber ports 106 in communication with the sound source 100 and the main chamber 104.

The manifold may be constructed from a plurality of materials such as metal, aluminum, cast-aluminum and serves as a thermal conductor and/or radiator that isolates the sound sources 100, such as compression drivers, from elevated temperatures. The end 108 of the manifold 102 is operably coupleable to the duct 12 in an airtight fashion and has provisions for pressure equalization between the front and back of the diaphragms (not shown) of the sound sources 100, such as the compression driver diaphragm. Another provision of the compression driver (described only briefly here) allows the sound sources 100 to be tuned electrically and mechanically to most efficiently generate sound within a 10% band of a specific center frequency. The center frequency may be adjusted through a manual or automatic tuning of individual sound sources 100 within the array.

It should be appreciated that either the acoustic generator 20 illustrated in FIG. 8 or 10 may be utilized with the acoustic agglomerator 10 and that, in some aspects, a plurality of acoustic generators 20 configured as illustrated in FIGS. 8 and 10 may be utilized as well. Although the acoustic generator 20 illustrated in FIG. 10 may be shown with a plurality of sound sources 100 coupled to the manifold 102, it will be appreciated in other aspects that only a single sound source 100 is coupled to a single manifold 102 while in other aspects a greater number of sound sources 100 may be coupled to a manifold 102 configured to receive a plurality of sound sources 100.

Furthermore, the configuration of the manifold 102, as illustrated in FIG. 10, represents only one possible configuration in the manifold 102 and a variety of manifold 102 configurations may be utilized and are sufficient for the purposes of the present invention and are within the spirit and scope of the present invention. It should also be appreciated that although the acoustic generators 20 illustrated in FIGS. 8 and 10 may be preferably utilized, in some aspects, a variety of sound source 100 configurations may be utilized so long as a given sound source is operable to produce a modulated acoustic field 22.

FIG. 11 illustrates a method 120 for agglomerating constituents 18 in a fluid, such as the fluid stream 16. At a first block 122 the method includes providing a fluid having constituents 18. In this block 122, as previously discussed, the fluid having constituents 18 may be in an open air environment, within a facility or building, or within an enclosed duct 12 or passageway 14. As previously discussed, the fluid stream 16 may include a gas or a liquid and the constituent 18 may be any type of material, whether liquid, gaseous or otherwise, provided in the fluid stream 16 that is desirably agglomerated for removal or other purposes.

At a block 124, the method includes applying an acoustic field 22 to the fluid stream 16. In this aspect the method may include, according to some aspects, including one or more acoustic generators 20 operable for generating a modulated acoustic field. At a block 126, the method provides for modulating the acoustic field 22.

As previously discussed, the acoustic field 22 may be amplitude modulated, frequency modulated or a combination of both frequency and amplitude modulated. Furthermore, in aspects where a plurality of acoustic generators 20 are utilized, a plurality of acoustic fields 22 each having varying characteristics of amplitude and frequency modulation may be employed. In aspects employing a plurality of acoustic generators 20, some of the acoustic generators 20 may produce acoustic fields 22 that may not necessarily be modulated.

FIG. 12 is a side view an acoustical stimulation system 200 that increases vapor diffusion towards a surface, according to one aspect of the invention. The acoustical stimulation system 200 includes the duct 12 defining the passageway 14 for communicating the fluid stream 16 containing the constituents 18. According to this aspect of the present invention, the constituents 18 may be sulfur oxides, nitrogen oxides, elemental or oxidized mercury or other constituents that may be desirably removed from the fluid stream for environmental and other reasons.

The acoustical stimulation system 200 in this aspect of the invention utilizes a reacting surface to facilitate removal of the constituent 18. The reacting surface in this aspect of the invention is a surface 208 of a sorbent 204, which is injected into passageway 14 with a sorbent injector 202. The sorbent injector 202 can be any device capable of injecting the sorbent 204 into the passageway 14; and, the sorbent 204 can be any of the typical sorbents 204 now known or later developed, including, but not limited to, activated carbon. While a sorbent injector 202, which injects a sorbent 204, has been shown in this aspect of the invention, other aspects of the invention may utilize other reacting surfaces, including, but not limited to chemical spray injections, fixed-bed adsorbers, catalytic converters, packed scrubber towers, and the like. The sorbent injector 202 may be provided on or adjacent to the duct 12—so long as it is operably located to inject the sorbent 204 upstream (or co-located with) the acoustic generator 20 or sound source. The acoustic generator 20 may be similar to the acoustic generator 20, described above with reference to FIGS. 1–11, or other sound sources operable to generate an acoustic field 206 having a sound pressure level, which according to some aspects, may be in a range of from about 130 to 170 dB at 20 microPascals and have a frequency in a range of from about 5 Hz to 30 kHz.

It should be expressly understood that the acoustic field 206 in some aspects of the invention may not be modulated, while in other aspects of the invention the acoustic field 206 can be modulated. Additionally, in some aspects of the invention, the acoustic field 206 may have a waveform defined as being sinusoidal, while in other aspects of the invention, the waveform may be a periodic waveform. In yet other aspects of the invention, the acoustic field may be a combination of any of the above variations of the acoustic field 206, including variations described with reference to FIGS. 1–11. Although only one acoustic generator 20 is illustrated in the present view, in other aspects of the invention of the invention, a plurality or an array of acoustic generators 20 may be utilized in various configurations and dispositions to produce acoustic fields 206 having similar or varying acoustic characteristics.

The present view illustrates the constituent 18, which may be entrained in the fluid stream 16, provided in the fluid passageway 14. The constituents 18 are at a point where the sorbent 204 is injected in the fluid passageway 14. Absent the presence of the acoustic generator 20, it will be appreciated that given an unlimited amount of time and/or distance in the fluid passageway 14, a considerable amount of the constituent 18 may potentially be sorbed by the sorbent 204; unfortunately, due to the limited distance in the duct 12 and time relative to the travel of the fluid stream 16 down the duct 12, only a small amount of the constituent 18 may have time to be sorbed by the sorbent 204. As such, an enhancement may be necessary to increase such sorption. Additionally, in some aspects of the invention, an enhancement may be the only way in which a desired level of constituents 18 can be removed.

It is to such an enhancement, and for other reasons, that one aspect of the present invention is provided to increase sorption of the constituents 18. This aspect of the invention provides for application of the acoustic field 206, which creates a stirring or mixing of the constituents 18 relative to the sorbent 204 to expose, for example, an increased amount of the constituents 18 to the sorbent 204. This novel technique causes the fluid stream 16, such as a gas exhaust, containing the constituents 18 to move substantially relative to the sorbent 204, substantially promoting increased vapor diffusion of the constituents 18 toward the surface 208 of the sorbent 204.

The acoustic stimulation system 200 can include an emissions analyzer 58 (such as a mercury analyzer or a sufur oxide analyzer or a nitrogen oxide analyzer, particle analyzer, opacity detector, etc.) help to determine the characteristics of the fluid stream 16. In a manner similar to that described above, with reference to FIG. 7, information from the emissions analyzer 58 can be communicated to the acoustic generator 20 to allow the acoustic field 206 to be adjusted—for example, by frequency, amplitude, or modulation; and, in some aspects of the invention, adjustments can be made to the sorbent injector 202 based on readings from the emissions analyzer 58.

As shown in this aspect of the invention, the acoustical stimulation system 200 can additionally include a baghouse 44 and a hopper 210 for collection of the sorbed constituent 18. While the baghouse 44 and hopper 210 have been shown in this aspect of the invention, it will be appreciated by one of ordinary skill in the art that a number of other collection and filtration devices may be utilized as well.

The use of the stimulation system 200 can be used independently of other current method and techniques used to capture undesirable or potentially hazardous constituents 18. For example, the acoustical stimulation system 200 may be utilized in conjunction with the other systems, such as those described with reference to FIGS. 1–11, or other current particle collection devices, such as electrostatic precipitator and baghouses, or systems located remotely from acoustical stimulation system 200—the other systems being, for example, upstream or downstream of the acoustical stimulation system 200. This can allow for continued capture of, for example, fly ash, while allowing for additional removal of, for example, mercury—thus, eliminating the potential of contaminating the fly ash with mercury or other hazardous materials.

In one aspect of the invention, the acoustical stimulation system 200 can be operably employed on a scrubber tower (not shown) whereby a liquid spray, such as a limestone slurry, is used to reduce constituents 18, such as sulfur oxides and/or nitrogen oxides. The sorbent 204, in this instance, is the limestone slurry. Application of the acoustic field 206 generated by one or more acoustic generators 20 increases the sorption of the constituents 18 by the sorbent 204. Thereafter the sorbent 204 may be desirably removed utilizing known techniques.

One advantage of employing the present invention is that more sorption by the sorbent 204 of the constituents 18 may be achieved further reducing the constituent 18, such as sulfur oxide, in the fluid stream 16 for environmental and other reasons. As briefly mentioned above, such an enhanced sorption may be the only way in which a desired removal level of constituents 18 can be obtained. Also, because the sorbent 204 sorbs more of the constituent 18 less sorbent 204 may be necessary to achieve the same constituent 18 reduction achieved by prior systems, thereby providing a cost savings.

Figure 13:
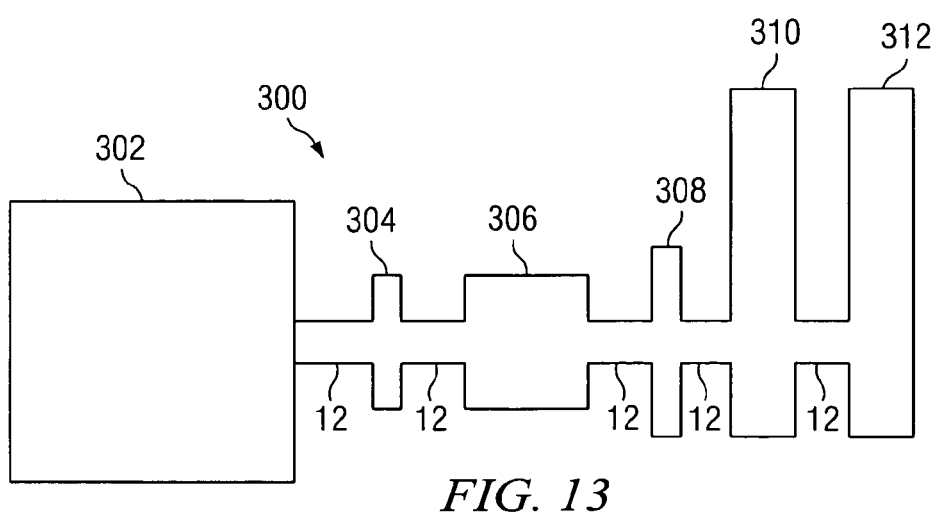
FIG. 13 is a side view of a power plant system illustrating implementation of one aspect of the present invention.

FIG. 13 illustrates a power plant 300, such as a coal-fired power plant, wherein the present invention may be employed. The power plant 300 may include a boiler 302, a heat exchanger 304, a particulate collection device 306, a baghouse 308, a scrubber tower 310, and a stack 312. The duct 12 communicates the gas exhaust or fluid stream 16 (not shown, but seen, e.g., in FIG. 12) between the several devices. It will be appreciated that a number of power plant configurations are or may be employed that may be similar or different to the power plant 300 illustrated. However, the present view of the power plant 300 is provided to illustrate implementation under various scenarios of the present invention.

In this illustration, the acoustical stimulation system 200 (not shown) may be coupled to or within the scrubber tower 310 for removal of constituents 18 (not shown—but, for example, sulfur). The acoustical stimulation system 200 (not shown) may be employed on the duct 12 between the particulate collection device 306 and the baghouse 308 or on the duct 12 downstream of the baghouse 308 or in some aspects, upstream of the particulate collection device 306.

In one aspect, the acoustic agglomerator 10 (not shown) may be coupled to, for example, the duct 12 upstream of the particulate collection device 306 for agglomeration and removal of particulate matter, such as fly ash, and the acoustical stimulation system 200 (not shown) may be employed downstream of the particulate collection device 306 for removal of constituents 18 (not shown—but, for example, mercury). In other aspects, the acoustical stimulation system 200 (not shown) may also be employed in the scrubber tower 310 to promote sorption of, for example, nitrogen and/or sulfur oxides. In any event, it should be appreciated that the present invention is in no way limited to the acoustic agglomerator 10 (not shown) or to power plant implementations and the present invention may be used in numerous commercial and other applications, such as waste incinerators or in catalytic devices.

FIGS. 14A–14D show the use of acoustic fields 206 to extend the life of filtration devices that collect constituents 18 (such as fly ash) and/or sorbents 204, according to one aspect of the invention. As indicated in the background of the invention, a promising method for the capture of constituents 18 (e.g, mercury or the like) in a facility such as coal-fired power plants involves the use of a sorbent injector 202 that continuously injects a sorbent 204 (e.g., 5–30 micron activated carbon particles) upstream of a bag or fabric filter 48. Illustration of this process is shown with reference to FIG. 14A. Generally, the duct 12 defines a passageway 14 for communicating the fluid stream 16 containing the constituents 18. After injection of the sorbent 204 via sorbent injector 202, the sorbent 204 along with constituents 18 (such as fly ash) build up in a cake on the fabric filter 48 in a bag house 44. The fabric filter 48 is cleaned periodically by various methods (e.g., typically, compressed air blows into the bag opposing the flue gas flow) when the pressure drop across the fabric filter 48 reaches a predetermined point. One aspect of the present invention can reduce the negative impact of sorbent injection on bag filters 48 and improve removal of constituent 18 by permitting thicker sorbent cake buildup at a reduced differential pressure. While such an aspect is disclosed with regards to sorbent injection, it should be understood that in yet another aspects of the present invention (e.g., when sorbent is not injected) reduction of the negative impact of fly ash on bag filters can still be obtained—for example, similar to that described above with reference to FIG. 6. In such aspects, removal of constituent 18 is permitted via thicker fly ash cake buildup at a reduced differential pressure.

Figure 14A:
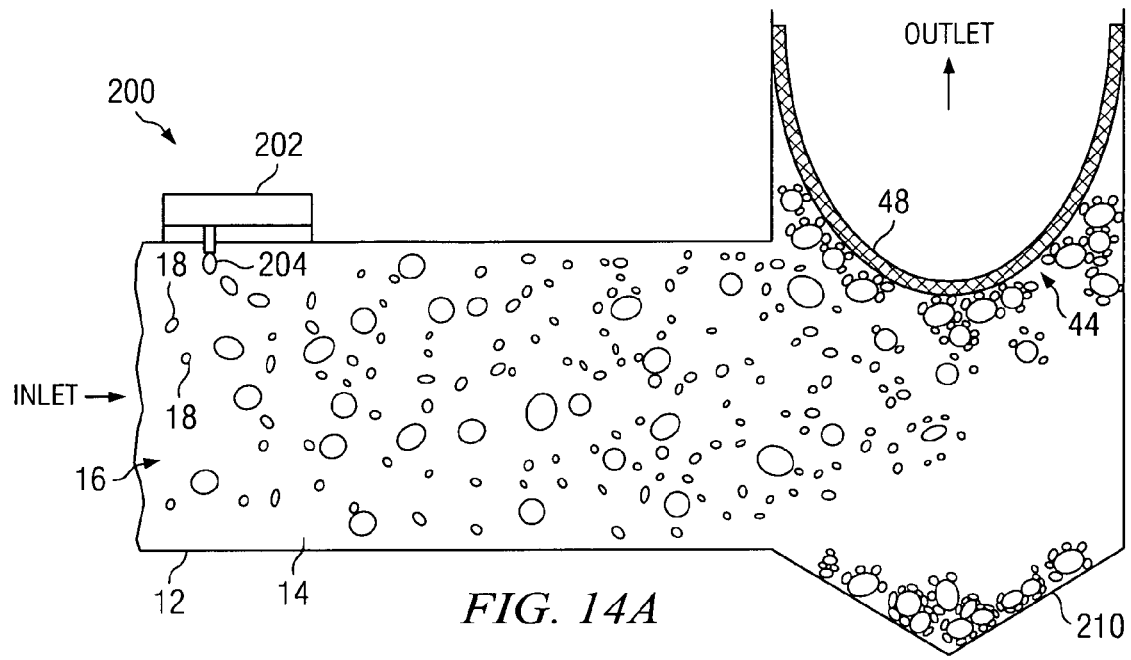
FIGS. 14A–14D show the use of acoustic fields to extend the life of filtration devices that collect sorbents, according to one aspect of the invention.
Figure 14B:
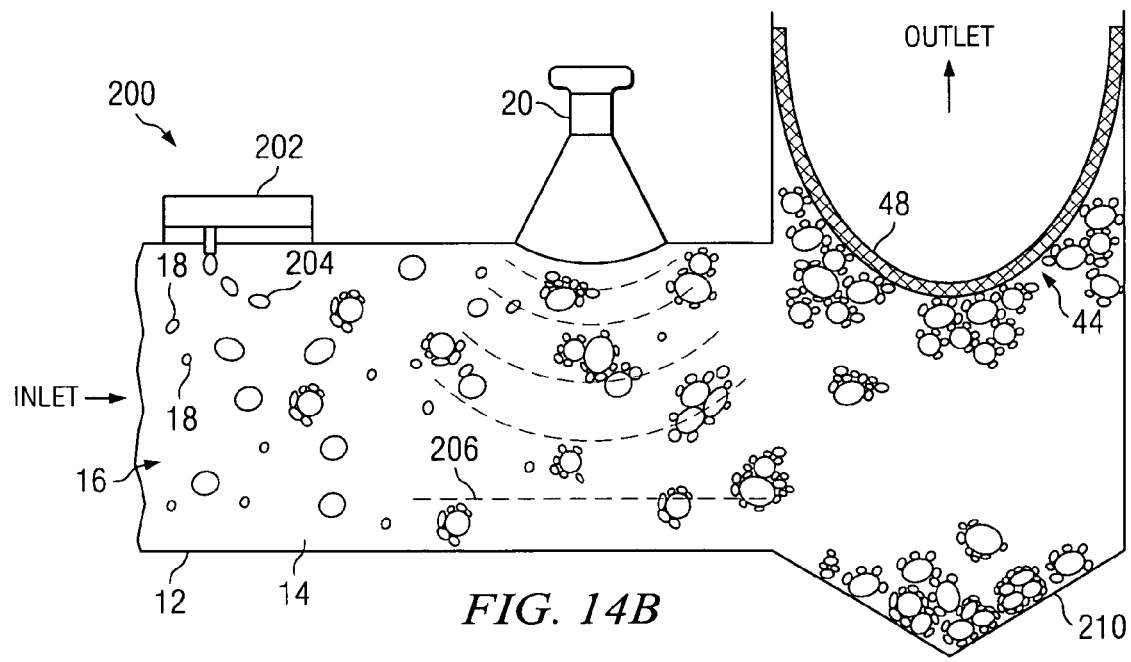

The basic concept of the above aspect with regards to sorbent injection is illustrated with reference to FIG. 14B. By exposing the constituent 18 (e.g., fly ash) and sorbent 204 to the acoustic field 206 (e.g., typically 1–2 seconds of exposure to the acoustic field 206) from an acoustic generator 20, the rapid formation of agglomerates occurs. Tightly packed agglomerates lead to the formation of a more porous filter cake. The porous cake can build up to greater thickness before cleaning is required, thereby increasing the time between cleanings. In a specific use (e.g. coal-fired power plants with removal of mercury desired), the acoustic effect on caking is largely independent of the type of coal being burned and the relative speciation of the mercury. The improved filter cake porosity can cause several desirable effects including, but not limited to, the slower buildup of pressure-drop across the fabric filter 48, the buildup of a thicker sorbent and/or fly ash cake on the fabric filter 48, the reduction of frequency of cleaning, the reduction of maintenance, and the buildup of a increased capture of the constituent 18 (e.g., mercury and fly ash particulate) due to thicker sorbent cake.

Figure 14C:
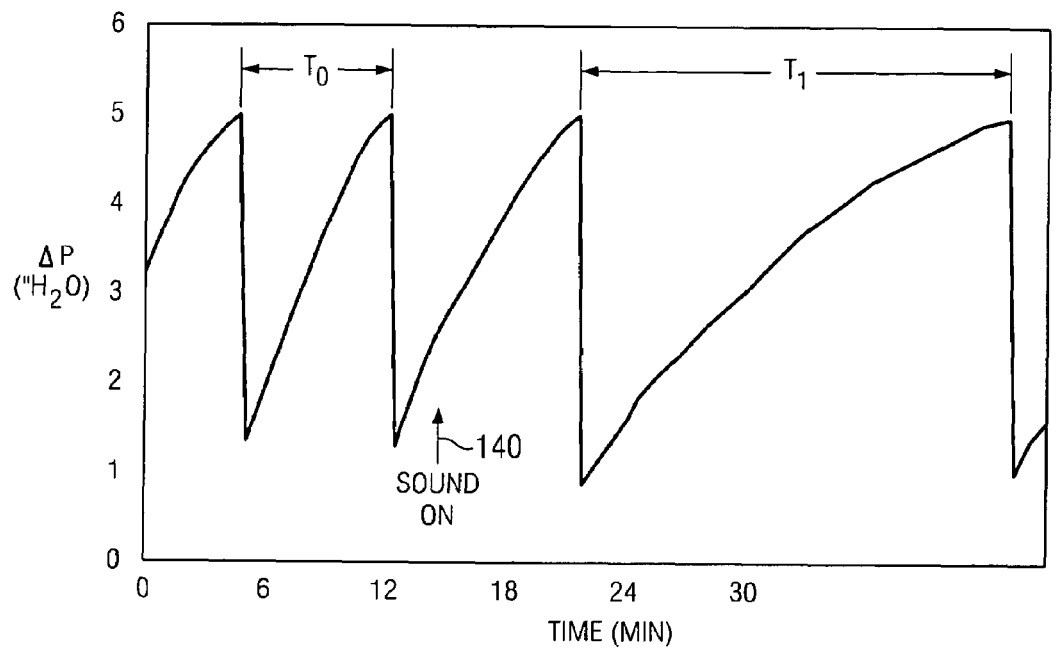
Figure 14D:
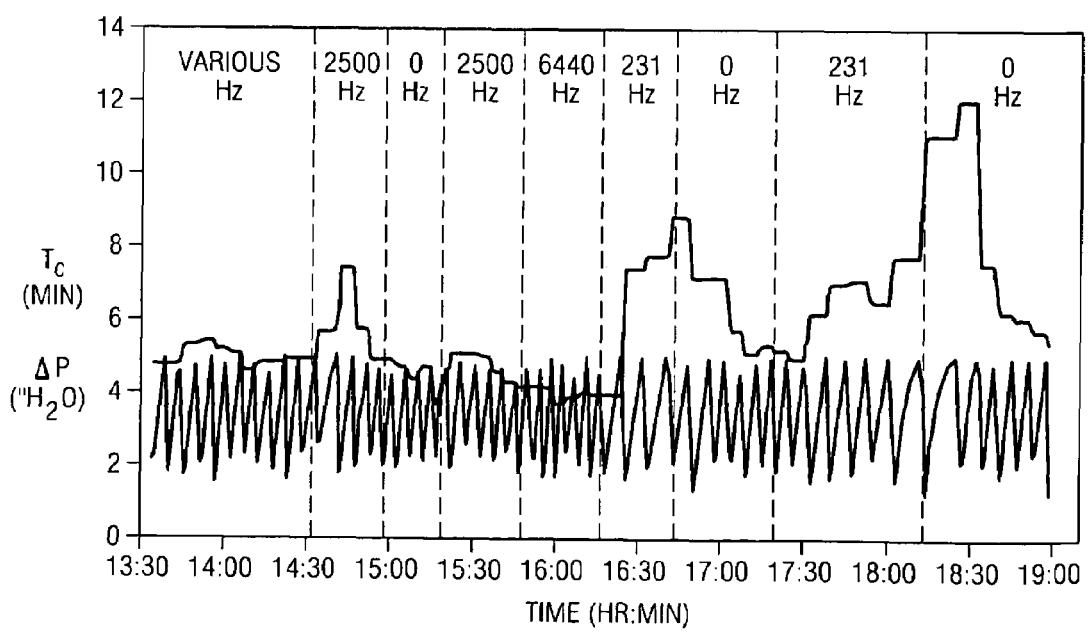

With reference to FIGS. 14C and 14D, illustrative data is shown from a slip-stream test. FIG. 14C shows representative data of bag cleaning with and without a sound field 206—e.g, from the acoustic genator 20 of FIG. 14B. In the chart of FIG. 14C, time is referenced against a change in pressure ΔP—the change in pressure ΔP from approximately 1.5 to 5 indicating that the bag or fabric filter 48 needs to be cleaned. The time between bag cleanings (referenced by $T_0$ and $T_1$) is shown before and after application of a sound field 206 (indicated by arrow 140). The time between bag cleanings is more than doubled by application of the sound field 206 upstream of the fabric filter 48.

FIG. 14D shows a much larger data set that includes several different acoustic frequencies of the sound field 206. In this particular illustrative aspect, the lowest acoustic frequency (231 Hz) most dramatically increases the bag cleaning period (or, equivalently, decreases the bag cleaning frequency). The data in FIG. 14C between times 17:20 to 18:15 shows that the application of sound field 206 causes a gradual increase in the cleaning period. Several bag cleaning cycles may be necessary before the full benefit is realized—a near tripling of cleaning period. Such a gradual increase indicates that the structure of the bag cake is gradually transformed as repeated cleaning cycles remove past caking by individual particles and replace them with larger agglomerates.

FIG. 15 is a flow-chart illustrating one method 400 for removing constituents from a fluid stream. The method 400 includes, at a block 402, providing a duct defining a fluid passageway and providing a fluid stream having a constituent in the fluid passageway of the duct. The method 400, at a block 404, further provides for injecting a sorbent in the fluid stream. The method 400, at a block 406, provides applying an acoustic field in the fluid stream to promote sorption of at least some of the constituents. In the step of block 406, the acoustic field can be any of the acoustic fields, describe herein—modulated, non-modulated, and the like. At a block 408, the method 400 also provides for collecting the sorbent 204, such as by the particle collection device, for example, the baghouse 44 or any of the other collection devices, described herein.

FIG. 16 shows a flow-chart of a method 500 of determining a frequency of sound to increase the acoustical stimulation of vapor diffusion, according to an aspect of the invention. Given a certain set of parameters, the simple arbitrary choice of a frequency can degrade performance of a vapor diffusion towards a surface—or, at the least, produce no improvement of vapor diffusion. Contrariwise, the selection of an appropriate frequency for a given set of parameters can maximize performance of the vapor diffusion towards a surface. A flow-chart for a method of maximizing such a vapor diffusion performance is shown in FIG. 16. According to this aspect, the method 500, at block 502, provides for selecting a sound pressure level of an acoustic field. The method 500, at block 504, provides for calculating a time harmonic acoustic displacement of a fluid stream. The method 500 includes, at a block 506, calculating a time harmonic displacement of a sorbent particle (or spray droplet) in response to the acoustic field and any associated viscous drag effect. In the step of block 506, the sorbent particle (or spray droplet) can be approximated as a rigid sphere of uniform density; additionally, laminar flow can be assumed. The method 500, at a block 508, includes calculating a relative displacement amplitude of the sorbent particle (or spray droplet) by subtracting the displacement of the sorbent particle from the displacement of the fluid stream.

At a block 510, the method 500 further provides for calculating the relative displacement over a plurality of frequencies to produce a curve such that the curve includes a global maximum wherein the global maximum is the frequency to increase the acoustical stimulation of vapor diffusion.

FIG. 17 is a chart, corresponding to another method of determining a frequency of sound to increase the acoustical stimulation of vapor diffusion, according to an aspect of the invention. In this aspect of the invention, the fluid is a gas. Due to viscosity in the flue gas surrounding an injected sorbent particle, the sorbent will move in response to the sound field. One of the simplest descriptions of the particle's motion is given by following equation:

$$m_p \frac{du_p}{dt} = 6\pi\mu\gamma_p(u_{gas} - u_p)$$

where $u_p$ is the velocity (i.e., meters per second) of the particle as a function of time t. For a sinusoidal sound field, the preceding equation has solutions of the form $$u_p = \eta U_{gas} \sin(\omega t - \phi)$$

where ω is the angular frequency, the entrainment coefficient η is:

$$\eta = \frac{1}{\sqrt{1 + \omega^2 \tau^2}}$$

and the particle relaxation time τ is:

$$\tau = \frac{2\rho_p \gamma_p^2}{9\mu}$$

and $U_{gas}$ is the velocity amplitude of a sinusoidal acoustic wave which can be related to the sound pressure level (SPL) according to:

$$p = \rho c U_{gas}$$

$$SPL = 20 \log_{10}(<p>_{rms}/p_{ref})$$

where p is the acoustic pressure, < >rms denotes calculation of the root mean square, pref=20 microPascals, ρ=gas density, and c=the speed of sound. The displacement of the particle $\xi_p$ (i.e., in meters) as a function of time is:

$$\xi_p = u_p/\omega$$

where ω is the angular frequency. The displacement of the particle relative to the surrounding flue gas is:

$$\Delta x = |U_{gas} - u_p|/\omega$$

The relationships above can be used to calculate the curves shown in the FIG. 17. Line 610 line shows the acoustic displacement of the gas in response to an applied sound field of 150 dB. Line 620 shows the relative displacement (Δx) of a 15 micron diameter activated carbon particle having 750 kg/m3 density when 150 dB sound is applied. At very low frequencies, viscosity dominates and the result is that the particle moves very little relative to the surrounding flue gas (Δx is small because there is very little particle slip).

At very high frequencies, the sound field slips past the particle, but the actual displacement is very small because of the 1/ω dependence on frequency. A frequency of about 500 Hz maximizes the displacement. The displacement (for 150 dB) is about 0.3 millimeters, which is equivalent to 20 particle diameters.

It should be expressly understood that the method 500, above, and the theoretical model, described with reference to FIG. 17, are only examples of methods for determining a frequency. The present invention should in no way be limited to these methods of frequency selection as others should become apparent to one of ordinary skill in the art. For example, in other aspects of the invention, the selected frequency can dynamically change, based upon potentially changing characteristics of the fluid stream 16 as measured by an emissions analyzer 58 (FIG. 12)—the selected frequency responsive to changing characteristics of the fluid stream 16. In yet other aspects of the invention, the frequency can be selected by trial and error or automated frequency scanning control methods.

Thus, it is apparent that there has been provided, in accordance with the present invention, an acoustical stimulation of vapor diffusion system and method that satisfies one or more of the advantages set forth above. Although the preferred embodiment has been described in detail, it should be understood that various changes, substitutions, and alterations can be made herein without departing from the scope of the present invention, even if all of the advantages identified above are not present. The various embodiments shown in the drawings herein illustrate that the present invention may be implemented and embodied in a variety of different ways that still fall within the scope of the present invention.

Also, the techniques, designs, elements, and methods described and illustrated in the preferred embodiment as discrete or separate may be combined or integrated with other techniques, designs, elements, or methods without departing from the scope of the present invention. Other examples of changes, substitutions, and alterations are readily ascertainable by one skilled in the art and could be made without departing from the spirit and scope of the present invention.

I claim:

1. An apparatus for removing constituent from a fluid stream, the apparatus comprising:
   a duct having a fluid passageway to receive a fluid stream having constituent;
   a collection device coupled to the duct, the collection device in communication with the fluid passageway to filter the fluid stream;
   a sorbent injector to inject a sorbent in the fluid passageway of the duct, wherein the injection of the sorbent into the fluid passageway is upstream of the collection device; and
   an acoustic generator to generate an acoustic field in the fluid passageway of the duct to promote sorption of at least some of the constituent for collection by the collection device, the acoustic field having a frequency of sound determined to increase acoustical stimulation, and wherein the acoustic field is modulated according to different frequency and amplitude modulation ranges, and wherein said modulation is based on: (1) a time harmonic acoustic displacement of a fluid stream, (2) a time harmonic displacement of an agent particle in response to the acoustic filed and an associated viscous drag effect, (3) a relative displacement amplitude of the agent particle determined by subtracting the displacement of the fluid stream, or (4) a relative displacement over a plurality of frequencies to produce a curve such that the curve includes a global maximum wherein the global maximum is the sound to increase the acoustical simulation of diffusion.

2. The apparatus of claim 1, wherein the acoustic generator is further defined as an array of sound sources mounted along the duct to produce a plurality of acoustic fields in the fluid passageway of the duct.

3. The apparatus of claim 1, wherein the acoustic field is further defined as having a peak sound pressure level referenced to 20 microPascals of 130 to 170 dB.

4. The apparatus of claim 1, wherein the acoustic field is further defined as having frequencies in the range 5 Hz to 30 kHz.

5. The apparatus of claim 1, wherein the acoustic field is further defined as having a sinusoidal waveform.

6. The apparatus of claim 1, wherein the acoustic field is further defined as having a modulated waveform.

7. The apparatus of claim 1, wherein the acoustic field is further defined as having a periodic waveform.

8. The apparatus of claim 1, wherein at least a portion of the constituent is vapor.

9. The apparatus of claim 1, wherein at least a portion of the constituent is mercury and wherein the sorbent is powdered or granular.

10. The apparatus of claim 9, wherein the mercury is oxidized mercury.

11. The apparatus of claim 9, wherein the mercury is elemental mercury.

12. The apparatus of claim 9, wherein the sorbent is activated carbon.

13. The apparatus of claim 1, wherein at least a portion of the constituent is an oxide of sulfur and wherein the sorbent is a limestone slurry.

14. The apparatus of claim 1, wherein at least a portion of the constituent is an oxide of nitrogen and wherein the sorbent is a limestone slurry.

15. The apparatus of claim 1, wherein the apparatus further includes a second collection device upstream of the sorbent injector.

16. The apparatus of claim 15, wherein the collection device is further defined as a baghouse and wherein the second collection device is further defined as an electrostatic precipitator.

17. The apparatus of claim 1, wherein the fluid stream is further defined as a gas exhaust stream.

18. The apparatus of claim 17, wherein at least a portion of the constituent is mercury.

19. The apparatus of claim 17, wherein the gas exhaust stream is further defined as gas exhaust from a coal-fired power plant.

20. The apparatus of claim 1, further comprising: a second acoustic generator adapted to generate a modulated acoustic field in the fluid passageway of the duct upstream of the sorbent injector to promote agglomeration of at least a portion of the constituent in the fluid stream.

21. The apparatus of claim 20, further comprising: a second collection device coupled downstream of a point of application of the modulated acoustic field, the second collection device in communication with the fluid passageway to promote removal of the agglomerated constituent.

22. The apparatus of claim 21, wherein the modulated acoustic field is further defined as frequency modulated.

23. The apparatus of claim 21, wherein the modulated acoustic field is further defined as amplitude modulated.

24. The apparatus of claim 1, wherein the apparatus further comprises: a hopper operably positioned to accumulate at least a portion of the constituent removed from the fluid stream.

25. The apparatus of claim 1, wherein the collection device is a filter.

26. The apparatus of claim 1, wherein the collection device is an electrostatic precipitator.

27. The apparatus of claim 1, wherein the collection device is a baghouse.

28. The apparatus of claim 1, wherein the collection device is a cyclone separator.

29. The apparatus of claim 1, wherein the collection device is a gravitational settling chamber.

30. The apparatus of claim 1, wherein at least a portion of the constituent is fly ash.

31. The apparatus of claim 1, wherein the acoustic field is frequency modulable.

32. The apparatus of claim 1, wherein the acoustic field is amplitude modulable.

33. The acoustic agglomerator of claim 32, wherein the acoustic field is frequency modulable.

34. The apparatus of claim 1, further comprising: wherein the fluid stream is a combustion gas from a power plant.

35. The apparatus of claim 34, wherein the power plant is a lignite fired power plant.

36. The apparatus of claim 34, wherein the power plant is a natural gas fired power plant.

37. The apparatus of claim 34, wherein the power plant is a municipal waste fired power plant.

38. The apparatus of claim 34, wherein the power plant is a diesel power generator.

39. The apparatus of claim 34, wherein the power plant is an agricultural fired power plant.

40. The apparatus of claim 1, wherein the acoustic generator is a plurality of acoustic generators; and each of the plurality of acoustic generators is adapted to generate a modulated acoustic field in the duct.

41. The apparatus of claim 40, wherein each of the plurality of acoustic generators is adapted to generate a frequency modulated acoustic field.

42. The apparatus of claim 41, wherein each of the plurality of acoustic generators is adapted to generate a frequency modulated acoustic field unique relative to each of the other plurality of acoustic generators.

43. The acoustic agglomerator of claim 40, wherein each of the plurality of acoustic generators is adapted to generate an amplitude modulated acoustic field.

44. The acoustic agglomerator of claim 43, wherein each of the plurality of acoustic generators is adapted to generate an amplitude modulated acoustic field unique relative to each of the other plurality of acoustic generators.

45. The apparatus of claim 1, further comprising: an emissions analyzer, operable to receive information concerning the fluid stream.

46. The apparatus of claim 45, wherein a frequency of the sound field is selected based upon information received from the emissions analyzer, concerning the fluid stream.

47. A method for removing constituent from a fluid stream, comprising:
   injecting a sorbent in the fluid stream, the fluid stream having constituent; and
   applying an acoustic field in the fluid stream to promote sorption of at least some of the constituent, the acoustic field having a frequency of sound determined to increase acoustical stimulation, and wherein the acoustic field is modulated according to different frequency and amplitude modulation ranges, and wherein said modulation is based on: (1) a time harmonic acoustic displacement of a fluid stream, (2) a time harmonic displacement of an agent particle in response to the acoustic filed and an associated viscous drag effect, (3) a relative displacement amplitude of the agent particle determined by subtracting the displacement of the fluid stream, or (4) a relative displacement over a plurality of frequencies to produce a curve such that the curve includes a global maximum wherein the global maximum is the sound to increase the acoustical simulation of vapor diffusion.

48. The method of claim 47, further comprising: providing a collection device, wherein the collection devices is in communication with the fluid stream; and the collection device is downstream relative to a point wherein the sorbent is injected into the fluid stream.

49. The method of claim 47, wherein the step of applying an acoustic field in the fluid stream further includes: providing an array of sound sources to produce a plurality of acoustic fields in the fluid passageway of the duct.

50. The method of claim 47, wherein the acoustic field in the step of applying an acoustic field in the fluid stream has a sound pressure level referenced to 20 microPascals in the range of 130 to 170 dB.

51. The method of claim 47, wherein the acoustic field in the step of applying an acoustic field in the fluid stream has a frequencies in the range 5 Hz to 30 kHz.

52. The method of claim 47, wherein the acoustic field in the step of applying an acoustic field in the fluid stream has a sinusoidal waveform.

53. The method of claim 47, wherein the acoustic field in the step of applying an acoustic field in the fluid stream has a modulated waveform.

54. The method of claim 47, wherein the acoustic field in the step of applying an acoustic field in the fluid stream has a periodic waveform.

55. The method of claim 47, wherein at least a portion of the constituent is vapor.

56. The method of claim 47, wherein at least a portion of the constituent is mercury and wherein the sorbent is powdered or granular.

57. The method of claim 56, wherein the sorbent is activated carbon.

58. The method of claim 47, wherein at least a portion of the constituent is an oxide of sulfur and wherein the sorbent is a limestone slurry.

59. The method of claim 47, wherein at least a portion of the constituent is an oxide of nitrogen and wherein the sorbent is a limestone slurry.

60. The method of claim 47, further comprising: providing a second collection device upstream of the sorbent injector.

61. The method of claim 47, wherein the fluid stream is further defined as a gas exhaust stream.

62. The method of claim 61, wherein at least a portion of the constituent is mercury.

63. The method of claim 61, wherein the gas exhaust stream is further defined as gas exhaust from a coal-fired power plant.

64. The method of claim 47, further comprising: providing a hopper operably positioned to accumulate at least a portion of the constituent removed from the fluid stream.

65. The method of claim 47, further comprising: filtering the fluid stream with a collection device.

66. The method of claim 65, wherein the collection device is a filter.

67. The method of claim 65, wherein the collection device is an electrostatic precipitator.

68. The method of claim 65, wherein the collection device is a baghouse.

69. The method of claim 65, wherein the collection device is a cyclone separator.

70. The method of claim 65, wherein the collection device is a gravitational settling chamber.

71. The method of claim 65, further comprising: providing a second acoustic generator adapted to generate a modulated acoustic field in the fluid passageway of the duct upstream of the sorbent injector to promote agglomeration of at least a portion of the constituent in the fluid stream.

72. The method of claim 71, further comprising: providing a second collection device coupled downstream of a point of application of the modulated acoustic field, the second collection device in communication with the fluid passageway to promote removal of the agglomerated constituent.

73. The method of claim 72, wherein the modulated acoustic field is further defined as frequency modulated.

74. The method of claim 72, wherein the modulated acoustic field is further defined as amplitude modulated.

75. The method of claim 47, wherein at least a portion of the constituent is a fly ash.

76. The method of claim 47, further comprising: determining a frequency of the acoustic field to apply to the fluid stream.

77. The method of claim 76, wherein the step of determining a frequency further comprises: selecting a sound pressure level of the acoustic field; calculating a time harmonic acoustic displacement of the fluid stream; calculating a time harmonic displacement of an agent particle in response to the acoustic field and an associated viscous drag effect; calculating a relative displacement amplitude of the agent particle by subtracting the displacement of the agent particle from the displacement of the fluid stream; and calculating the relative displacement over a plurality of frequencies to produce a curve such that the curve includes a global maximum wherein the global maximum is the frequency determined.

78. The method of claim 76, wherein the step of determining frequency further comprises: applying a model based upon parameters of the fluid stream.

79. The method of claim 76, wherein the step of determining frequency further comprises: observing the transfer of the constituent towards the sorbent over several frequencies; and selecting the frequency that provide the greatest transfer of the sorbent.

80. An apparatus for removing constituent from a fluid stream, the apparatus comprising:
a scrubber tower having a chamber defining a fluid passageway to receive a fluid stream having constituent;
a liquid injector coupled to the scrubber tower, the liquid injector operable to inject a liquid agent in the scrubber tower;
an acoustic generator to generate an acoustic field in the chamber of the scrubber tower to promote a chemical reaction between the liquid agent and at least some of the constituent, the acoustic field having a frequency of sound determined to increase acoustical stimulation, and wherein the acoustic field is modulated according to different frequency and amplitude modulation ranges, and wherein said modulation is based on: (1) a time harmonic acoustic displacement of a fluid stream, (2) a time harmonic displacement of an agent particle in response to the acoustic filed and an associated viscous drag effect, (3) a relative displacement amplitude of the agent particle determined by subtracting the displacement of the fluid stream, or (4) a relative displacement over a plurality of frequencies to produce a curve such that the curve includes a global maximum wherein the global maximum is the sound to increase the acoustical simulation of vapor diffusion.

81. The apparatus of claim 80, wherein at least a portion of the constituent includes sulfur oxides.

82. The apparatus of claim 80, wherein at least a portion of the constituent includes nitrogen oxides.

83. The apparatus of claim 82, wherein at least a portion of the constituent includes sulfur oxides.

84. The apparatus of claim 80, wherein at least a portion of the constituent includes mercury.

85. The apparatus of claim 84, wherein the mercury is elemental mercury.

86. The apparatus of claim 84, wherein the mercury is oxidized mercury.

87. The apparatus of claim 80, wherein the scrubber tower is a packed scrubber tower.

88. The apparatus of claim 80, wherein the scrubber tower is a spray scrubber tower.

89. The apparatus of claim 80, wherein the liquid agent is a limestone slurry for removing sulfur oxides.

90. The apparatus of claim 80, wherein the liquid agent is a limestone slurry for removing nitrogen oxides.

91. The apparatus of claim 90 wherein the limestone slurry further removes sulfur oxides.

92. The apparatus of claim 80, wherein the liquid agent is a limestone slurry and at least a portion of the constituent includes mercury.

93. The apparatus of claim 92, wherein the mercury is elemental mercury.

94. The apparatus of claim 92, wherein the mercury is oxidized mercury.

95. The apparatus of claim 80, wherein the acoustic generator is further defined as an array of sound sources to generate the acoustic field.

96. The apparatus of claim 80, wherein the sound field has a peak sound pressure level, referenced to 20 microPascals, in the range of 130 to 170 dB and frequencies in the range 5 Hz to 30 kHz and wherein the acoustic field is further defined as having a sinusoidal waveform.

97. The apparatus of claim 80, wherein the sound field has a peak sound pressure level, referenced to 20 microPascals, in the range of 130 to 170 dB and frequencies in the range 5 Hz to 30 kHz and wherein the acoustic field is further defined as having a modulated.

98. The apparatus of claim 80, wherein the sound field has a peak sound pressure level, referenced to 20 microPascals, in the range of 130 to 170 dB and frequencies in the range 5 Hz to 30 kHz and wherein the acoustic field is further defined as having a general period waveform.

99. The apparatus of claim 80, wherein the fluid stream is further defined as a gas exhaust from a coal-fired power plant.

100. A method of enhancing mass transfer from a dilute vapor towards the surface of a sorbent, the method comprising:
providing a fluid stream having a dilute vapor;
injecting a sorbent having a surface into the fluid stream; and applying an acoustic field to the fluid stream to promote diffusion of the dilute vapor toward the surface of the sorbent, the acoustic field having a frequency of sound determined to increase acoustical stimulation, and wherein the acoustic field is modulated according to different frequency and amplitude modulation ranges, and wherein said modulation is based on: (1) a time harmonic acoustic displacement of a fluid stream, (2) a time harmonic displacement of an agent particle in response to the acoustic filed and an associated viscous drag effect, (3) a relative displacement amplitude of the agent particle determined by subtracting the displacement of the fluid stream, or (4) a relative displacement over a plurality of frequencies to produce a curve such that the curve includes a global maximum wherein the global maximum is the sound to increase the acoustical simulation of vapor diffusion.

101. The method of claim 100, further comprising: providing a collection device to collect the sorbent and vapor that reacts with the sorbent.

102. The method of claim 100, wherein the diffusion of the vapor towards the surface of the sorbent is a physical adsorption.

103. The method of claim 100, wherein the diffusion of the vapor towards the surface of the sorbent is a chemical absorption.

104. The method of claim 100, wherein the vapor is a constituent of a fluid stream; the fluid stream is a gas exhaust from a coal fired power plant; the vapor is elemental or oxidized mercury; and the sorbent is activated carbon.

105. The method of claim 100, wherein the acoustic field is generated by an array of sound sources.

106. A method of enhancing mass transfer from a dilute vapor towards the surface of a sorbent, the method comprising:
providing a gas stream having a dilute vapor; injecting a liquid spray into the fluid stream;
applying an acoustic field to the fluid stream to promote removal of the dilute vapor, the acoustic field having a frequency of sound determined to increase acoustical stimulation, and wherein the acoustic field is modulated according to different frequency and amplitude modulation ranges, and wherein said modulation is based on: (1) a time harmonic acoustic displacement of a fluid stream, (2) a time harmonic displacement of an agent particle in response to the acoustic filed and an associated viscous drag effect, (3) a relative displacement amplitude of the agent particle determined by subtracting the displacement of the fluid stream, or (4) a relative displacement over a plurality of frequencies to produce a curve such that the curve includes a global maximum wherein the global maximum is the sound to increase the acoustical simulation of vapor diffusion; and
providing a collection device to collect the liquid which has chemically reacted with the dilute vapor.

107. The method of claim 106, wherein the liquid spray is a liquid spray droplet or liquid layer on packing material that acts to remove the dilute vapor by chemical reaction.

108. The method of claim 106, wherein at least a portion of the dilute vapor is a sulfur oxide and the fluid stream is a gas exhaust from a coal-fired power plant.

109. The method of claim 106, wherein at least a portion of the dilute vapor is a nitrogen oxide and the fluid stream is a gas exhaust from a coal-fired power plant.

110. The method of claim 109 wherein at least a portion of the dilute vapor is a sulfur oxide.

111. The apparatus of claim 106, wherein at least a portion of the dilute vapor includes mercury.

112. The apparatus of claim 111, wherein the mercury is elemental mercury.

113. The apparatus of claim 111, wherein the mercury is oxidized mercury.

114. The method of claim 106, wherein the liquid spray is a limestone slurry.

115. The method of claim 106, the acoustic field is generated by an array of sound sources.

116. The method of claim 106, wherein the fluid stream is provided in a scrubber tower that utilizes a high surface area packing material.

117. The method of claim 106, wherein the fluid stream is provided in a scrubber tower that utilizes a high surface area spray.

118. The method of claim 117, wherein the fluid stream is provided in a scrubber tower that further utilizes packing material.

119. A method of determining a frequency of sound to increase the acoustical stimulation of vapor diffusion, the method comprising:
selecting a sound pressure level of an acoustic field;
calculating a time harmonic acoustic displacement of a fluid stream;
calculating a time harmonic displacement of an agent particle in response to the acoustic field and an associated viscous drag effect;
calculating a relative displacement amplitude of the agent particle by subtracting the displacement of the agent particle from the displacement of the fluid stream;
calculating the relative displacement over a plurality of frequencies to produce a curve such that the curve includes a global maximum wherein the global maximum is the frequency to increase the acoustical stimulation of vapor diffusion.

120. The method of claim 119, wherein the agent particle is selected from a group consisting of a spray droplet, a liquid film or a sorbent.

121. The method of claim 120, wherein the sorbent is powdered of granular.

122. A method for extending the useful life of a filtration device, the method comprising:
providing a duct defining a fluid passageway;
providing a filtration device, operable to filter a fluid stream;
injecting a sorbent in the fluid stream;
applying an acoustic field in the fluid stream to promote sorption of at least some of the constituent, the acoustic field having a frequency of sound determined to increase acoustical stimulation, and wherein the acoustic field is modulated according to different frequency and amplitude modulation ranges, and wherein said modulation is based on: (1) a time harmonic acoustic displacement of a fluid stream, (2) a time harmonic displacement of an agent particle in response to the acoustic filed and an associated viscous drag effect, (3) a relative displacement amplitude of the agent particle determined by subtracting the displacement of the fluid stream, or (4) a relative displacement over a plurality of frequencies to produce a curve such that the curve includes a global maximum wherein the global maximum is the sound to increase the acoustical simulation of vapor diffusion; and
collecting the at least some of the constituent and at least some of the sorbent with the filtration device; and
removing the at least some of the constituent and the at least some of the sorbent from the filtration device to clean the filtration device.

123. The method of claim 122, wherein the fluid stream is a gas stream.

124. The method of claim 122, wherein the fluid stream is a liquid stream.

125. A method for enhancing transfer of constituent in a fluid towards a surface of a sorbent, comprising:
providing a fluid with a constituent;
injecting a sorbent having a surface into the fluid; and
applying a modulated acoustic field to the fluid to promote transfer of the constituent towards the surface of the sorbent, the acoustic field having a frequency of sound determined to increase acoustical stimulation, and wherein the modulated acoustic field is modulated according to different frequency and amplitude modulation ranges, and wherein said modulation is based on: (1) a time harmonic acoustic displacement of a fluid stream, (2) a time harmonic displacement of an agent particle in response to the acoustic filed and an associated viscous drag effect, (3) a relative displacement amplitude of the agent particle determined by subtracting the displacement of the fluid stream, or (4) a relative displacement over a plurality of frequencies to produce a curve such that the curve includes a global maximum wherein the global maximum is the sound to increase the acoustical simulation of vapor diffusion.

126. The method of claim 125, wherein the fluid is provided in an open area and wherein the modulated acoustic field is applied to the open area to cause the constituent to transfer towards the surface of the sorbent.

127. The method of claim 125, wherein the acoustic field is applied in a direction angularly arbitrary to a direction of flow of the fluid stream through the fluid passageway.

128. The method of claim 125, wherein the fluid is provided in a chamber and wherein the modulated acoustic field is applied to the fluid in the chamber to cause the constituent to transfer towards the surface of the sorbent.

129. The method of claim 125, wherein the fluid is provided in a fluid passageway and wherein the modulated acoustic field is applied to the fluid in the fluid passageway to cause the constituent to transfer towards the surface of the sorbent.

130. The method of claim 129, wherein the fluid passageway is further defined as a duct having a sidewall defining a passageway adapted to communicate the fluid.

131. The method of claim 130, wherein the duct is further defined as an exhaust duct.

132. The method of claim 130, wherein the duct has a substantially circular cross-section.

133. The method of claim 130, wherein the duct has a substantially oval cross-section.

134. The method of claim 130, wherein the duct has a substantially rectangular cross-section.

135. The method of claim 125, further comprising: applying a plurality of acoustic fields to the fluid; and modulating the plurality of acoustic fields to cause the constituent to agglomerate.

136. The method of claim 125, wherein the acoustic field is frequency modulable.

137. The method of claim 136, wherein the acoustic field is amplitude modulable.

138. The method of claim 137, wherein the frequency of the acoustic field is modulable in a range of up to 1 GHz and wherein the amplitude of the acoustic field is modulable in a range of up to 200 dB referenced to 20 micro-Pascals.

139. The method of claim 137, wherein the frequency of the acoustic field is modulable in a range of up to 20 kHz and wherein the amplitude of the acoustic field is modulable in a range of up to 200 dB referenced to 20 micro-Pascals.

140. The method of claim 137, wherein the frequency of the acoustic field is modulable in a range of from about 50 Hz to about 15 kHz and wherein the amplitude of the acoustic field is modulable in a range of from about 130 dB to about 175 dB referenced to 20 micro-Pascals.

141. The method of claim 125, wherein the fluid is a liquid.

142. The method of claim 125, wherein the fluid is a gas stream.

143. The method of claim 125, wherein the fluid is a combustion exhaust gas.

144. The method of claim 143, wherein at least a portion of the constituent is fly ash.

145. The method of claim 125, wherein the acoustic field is frequency modulable and wherein the acoustic field is amplitude modulable.

146. The method of claim 145, wherein the frequency modulation of the acoustic field is further defined as increasing the frequency of the acoustic field.

147. The method of claim 145, wherein the frequency modulation of the acoustic field is further defined as decreasing the frequency of the acoustic field.

148. The method of claim 125, wherein the acoustic field is exponentially modulated.

149. The method of claim 125, wherein a frequency of the acoustic field is modulated linearly.

150. The method of claim 125, wherein a frequency of the acoustic field is modulated non-linearly.

151. The method of claim 125, wherein a modulation of the acoustic field is applied for a periodic interval.

152. A method for enhancing transfer of constituent in a fluid towards a surface of a sorbent, comprising:
providing a fluid with constituent;
injecting a sorbent having a surface into the fluid; applying an acoustic field to the fluid, the acoustic field having a frequency of sound determined to increase acoustical stimulation, and wherein the acoustic field is modulated according to different frequency and amplitude modulation ranges, and wherein said modulation is based on: (1) a time harmonic acoustic displacement of a fluid stream, (2) a time harmonic displacement of an agent particle in response to the acoustic filed and an associated viscous drag effect, (3) a relative displacement amplitude of the agent particle determined by subtracting the displacement of the fluid stream, or (4) a relative displacement over a plurality of frequencies to produce a curve such that the curve includes a global maximum wherein the global maximum is the sound to increase the acoustical simulation of vapor diffusion; and
frequency modulating the acoustic field to promote transfer of the constituent towards the surface of the sorbent.

153. The method of claim 152, wherein the fluid is provided in an open area and wherein the frequency modulated acoustic field is applied to the open area to cause the constituent to transfer towards the surface of the sorbent.

154. The method of claim 152, wherein the fluid is provided in a chamber and wherein the frequency modulated acoustic field is applied to the fluid in the chamber to cause the constituent to transfer towards the surface of the sorbent.

155. The method of claim 152, wherein the fluid is provided in a fluid passageway and wherein the frequency modulated acoustic field is applied to the fluid in the fluid passageway to cause the constituent to transfer towards the surface of the sorbent.

156. The method of claim 155, wherein the fluid passageway is further defined as a duct having a sidewall defining a passageway adapted to communicate the fluid.

157. The method of claim 156, wherein in the duct is further defined as an exhaust duct.

158. The method of claim 152, further comprising: applying a plurality of acoustic fields to the fluid; and frequency modulating the plurality of acoustic fields to cause the constituent to transfer towards the surface of the sorbent.

159. The method of claim 158, wherein the frequency modulation of each of the plurality of acoustic fields are substantially similar.

160. The method of claim 158, wherein the frequency modulation of each of the plurality of acoustic fields are substantially different.

161. The method of claim 152, wherein the acoustic field is further defined has having a frequency in a range of up to 1 GHz.

162. The method of claim 152, wherein the acoustic field is further defined has having a frequency in a range of up to 20 kHz.

163. The method of claim 152, wherein the acoustic field is further defined has having a frequency in a range of from about 50 Hz to about 15 kHz.

164. The method of claim 152, wherein the acoustic field has an initial frequency and wherein the acoustic field is frequency modulated relative to the initial frequency to cause the constituent to transfer towards the surface of the sorbent.

165. The method of claim 164, wherein the acoustic field is modulated to a first frequency substantially less than the initial frequency.

166. The method of claim 164, wherein the acoustic field is modulated to a first frequency substantially greater than the initial frequency.

167. The method of claim 165, wherein the acoustic field is modulated to a second frequency substantially greater than the first frequency.

168. The method of claim 165, wherein the acoustic field is modulated to a second frequency substantially greater than the initial frequency.

169. The method of claim 166, wherein the acoustic field is modulated to a second frequency substantially less than the first frequency.

170. The method of claim 166, wherein the acoustic field is modulated to a second frequency substantially less than the initial frequency.

171. The method of claim 152, wherein the fluid is further defined as a liquid.

172. The method of claim 152, wherein the fluid is further defined as a gas.

173. The method of claim 152, wherein the fluid is further defined as a combustion exhaust gas.

174. The method of claim 173, wherein the combustion gas exhaust includes fly ash.

175. An apparatus for removing constituent from a fluid stream, the apparatus comprising:

- a duct having a sidewall defining a fluid passageway, the duct adapted to receive a fluid stream having the constituent;
- a manifold system coupled to the duct such that the manifold system communicates with the fluid passageway;
- a sorbent injector to inject a sorbent in the fluid passageway of the duct; and
- at least a first sound source coupled to the manifold system and operable to generate an acoustic field in the fluid passageway of the duct to promote sorption of at least some of the constituent, the acoustic field having a frequency of sound determined to increase acoustical stimulation, and wherein the acoustic field is modulated according to different frequency and amplitude modulation ranges, and wherein said modulation is based on: (1) a time harmonic acoustic displacement of a fluid stream, (2) a time harmonic displacement of an agent particle in response to the acoustic filed and an associated viscous drag effect, (3) a relative displacement amplitude of the agent particle determined by subtracting the displacement of the fluid stream, or (4) a relative displacement over a plurality of frequencies to produce a curve such that the curve includes a global maximum wherein the global maximum is the sound to increase the acoustical simulation of vapor diffusion.

176. The apparatus of claim 175, wherein the at a least first sound source is further defined as an electrodynamic compression driver.

177. The apparatus of claim 175, wherein the at least first sound source is further defined as operable to generate a sound pressure level of at least 150 dB referenced to 20 micro-Pascals at a range of 2 meters.

178. The apparatus of claim 177, wherein the manifold system further includes a main chamber in communication with the fluid passageway of the duct and at least a first channel in communication with the main chamber.

179. The apparatus of claim 178, wherein the manifold system is further defined as having a plurality of channels in communication with the main chamber.

180. The apparatus of claim 179, wherein the at least a first sound source is a plurality of sound sources; and each of the plurality of sound sources is coupled to one of the plurality of channels in communication with the main chamber.

181. The apparatus of claim 180, wherein the manifold system, including the plurality of channels in communication with the main chamber and the plurality of sound sources each coupled to one of the plurality of channels, defines a compression driver array and wherein a plurality of compression driver arrays are operably coupled to generate a modulated acoustic field within the fluid passageway of the duct.

182. The apparatus of claim 175, wherein the acoustic field is frequency modulable.

183. The apparatus of claim 182, wherein the acoustic field is further defined as amplitude modulable.

184. The apparatus of claim 175, wherein the acoustic field is amplitude modulable.

185. The apparatus of claim 184, wherein the frequency of the acoustic field is modulable in a range of up to 1 GHz and wherein the amplitude of the acoustic field is modulable in a range of up to 200 dB referenced to 20 micro-Pascals.

186. The apparatus of claim 184, wherein the frequency of the acoustic field is modulable in a range of up to 20 kHz and wherein the amplitude of the acoustic field is modulable in a range of up to 200 dB referenced to 20 micro-Pascals.

187. The apparatus of claim 184, wherein the frequency of the acoustic field is modulable in a range of from about 50 Hz to about 15 kHz and wherein the amplitude of the acoustic field is modulable in a range of from about 130 dB to about 175 dB referenced to 20 micro-Pascals.

188. An apparatus for removing constituent from a fluid stream, the apparatus comprising:

- a fluid passageway, operable to receive a fluid stream having constituent;

a collection device in communication with the fluid passageway, the collection device operable to filter the fluid stream;

a substance having a reacting surface, operable to react with the constituent; and an acoustic generator to generate an acoustic field in the fluid passageway to promote reaction of at least some of the constituent with the reacting surface of the substance for collection by the collection device, the acoustic field having a frequency of sound determined to increase acoustical stimulation, and wherein the acoustic field is modulated according to different frequency and amplitude modulation ranges, and wherein said modulation is based on: (1) a time harmonic acoustic displacement of a fluid stream, (2) a time harmonic displacement of an agent particle in response to the acoustic filed and an associated viscous drag effect, (3) a relative displacement amplitude of the agent particle determined by subtracting the displacement of the fluid stream, or (4) a relative displacement over a plurality of frequencies to produce a curve such that the curve includes a global maximum wherein the global maximum is the sound to increase the acoustical simulation of vapor diffusion.

189. The apparatus of claim 188, wherein the substance having a reacting surface and the collection device are part of a fixed bed absorber.

190. The apparatus of claim 188, wherein the substance having a reacting surface and the collection device are part of a catalytic converter.

191. The apparatus of claim 188, wherein the substance having a reacting surface and the collection device are part of a packed scrubber tower.

192. The apparatus of claim 188, wherein the substance having a reacting surface and the collection device are part of a spray scrubber tower.

193. The apparatus of claim 188, wherein the substance having a reacting surface is a sorbent injected into the fluid passageway with a sorbent injector.

194. The apparatus of claim 188, wherein the acoustic field further includes a frequency; and the frequency is determined from a model that calculates an optimum frequency from parameters of the fluid stream.

195. The apparatus of claim 188, wherein the acoustic field further includes a frequency; and the frequency is determined from an observance of an effect of several frequencies on the fluid stream.

* * * * *

UNITED STATES PATENT AND TRADEMARK OFFICE
CERTIFICATE OF CORRECTION

PATENT NO. : 7,238,223 B2
APPLICATION NO. : 10/700904
DATED : July 3, 2007
INVENTOR(S) : Meegan, Jr.

It is certified that error appears in the above-identified patent and that said Letters Patent is hereby corrected as shown below:

Column 17, claim 1, line 65, please delete "filed" and insert --field--.

Column 20, claim 47, line 5, please delete "filed" and insert --field--.

Column 20, claim 48, line 14, please delete "devices" and insert --device--.

Column 22, claim 80, line 1, please delete "filed" and insert --field--.

Column 22, claim 97, line 50, after "modulated" please insert --waveform--.

Column 23, claim 100, line 6, please delete "filed" and insert --field--.

Column 23, claim 106, line 42, please delete "filed" and insert --field--.

Column 24, claim 121, line 35, please delete "of" and insert --or--.

Column 24, claim 122, line 53, please delete "filed" and insert --field--.

Column 25, claim 125, line 16, please delete "filed" and insert --field--.

Column 26, claim 152, line 43, please delete "filed" and insert --field--.

Column 28, claim 175, line 9, please delete "filed" and insert --field--.

Column 28, claim 176, line 17, please delete "a".

UNITED STATES PATENT AND TRADEMARK OFFICE
CERTIFICATE OF CORRECTION

PATENT NO. : 7,238,223 B2
APPLICATION NO. : 10/700904
DATED : July 3, 2007
INVENTOR(S) : Meegan, Jr.

It is certified that error appears in the above-identified patent and that said Letters Patent is hereby corrected as shown below:

Column 29, claim 188, line 17, please delete "filed" and insert --field--.

Signed and Sealed this

Fifteenth Day of July, 2008

JON W. DUDAS
*Director of the United States Patent and Trademark Office*